(12) United States Patent
Marvin et al.

(10) Patent No.: US 9,893,979 B2
(45) Date of Patent: Feb. 13, 2018

(54) NETWORK TOPOLOGY DISCOVERY BY RESOLVING LOOPS

(71) Applicant: Cisco Technology, Inc., San Jose, CA (US)

(72) Inventors: Grant Allen Marvin, San Francisco, CA (US); Timothy J. Passaro, Oakland, CA (US); Justin Joel Delegard, San Francisco, CA (US); James Michael Roewe, San Francisco, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 77 days.

(21) Appl. No.: 14/720,759

(22) Filed: May 23, 2015

(65) Prior Publication Data

US 2016/0344614 A1  Nov. 24, 2016

(51) Int. Cl.
| | | |
|---|---|---|
| G06F 11/00 | (2006.01) | |
| H04L 12/751 | (2013.01) | |
| H04L 12/713 | (2013.01) | |
| H04L 12/46 | (2006.01) | |
| H04L 12/753 | (2013.01) | |
| H04L 12/705 | (2013.01) | |

(52) U.S. Cl.
CPC .......... *H04L 45/08* (2013.01); *H04L 12/4641* (2013.01); *H04L 45/18* (2013.01); *H04L 45/48* (2013.01); *H04L 45/586* (2013.01)

(58) Field of Classification Search
CPC combination set(s) only.
See application file for complete search history.

(56) References Cited

U.S. PATENT DOCUMENTS

| | | | | |
|---|---|---|---|---|
| 2010/0257400 | A1* | 10/2010 | Whitby-Strevens | H04L 41/0681 714/4.11 |
| 2014/0233422 | A1* | 8/2014 | Thubert | H04L 12/18 370/254 |
| 2016/0277272 | A1* | 9/2016 | Peach | H04L 43/106 |

* cited by examiner

*Primary Examiner* — Yemane Mesfin
*Assistant Examiner* — Mon Cherie Davenport
(74) *Attorney, Agent, or Firm* — Ronald Fernando

(57) ABSTRACT

Previously available network management systems fail to adequately enable discovery of a network topology that includes both compliant and non-compliant networking devices. By contrast, and to that end, various implementations disclosed herein include systems, methods and apparatuses that determine whether or not a loop exists within uplink metadata associated with first and second compliant devices, wherein the loop in the uplink metadata is characterized by pointers provided to indicate that the first and second compliant devices operate to send externally addressed traffic to one another contrary to the operation of the first and second compliant devices within a network; and resolve the loop by adding a non-compliant device to topology-link map data associated with the first and second compliant devices in response to determining the existence of the loop, wherein the topology-link map data archives accessible information about the topology of the network based at least on the uplink metadata.

19 Claims, 16 Drawing Sheets

NETWORK TOPOLOGY DISCOVERY BY RESOLVING LOOPS

TECHNICAL FIELD

The present disclosure generally relates to network topology discovery, and in particular, to the identification and resolution of loops in network topology-link map data.

BACKGROUND

The ongoing development, maintenance and expansion of data networks often involves incorporating additional functionality into and enabling greater connectivity with previously deployed equipment, in addition to deploying new networking equipment. As a result, typical data networks, from local area networks (LANs) to virtual LANs and wide area networks (WANs), often include an amalgamation of various types of networking equipment. For example, a typical LAN often includes equipment from various vendors, equipment that is operable in accordance with some standards and not others, and equipment of different generations—that have not all received the same software and/or firmware updates.

Managing data networks with various combinations of equipment presents a number of challenges. Often a first challenge is obtaining an accurate network topology-link map that shows the various pieces of networking equipment in a network, and the connections between them. In the typical course a network designer first creates a static networking topology-link map merely using a CAD tool in the process of initially planning out the deployment and installation of networking equipment infrastructure. However, the networking topology-link map is merely a guide, and there is neither a guarantee nor a requirement that the actual network is accurately represented by the networking topology-link map, even just after the initial installation. Additionally, over time, because of routine maintenance, upgrades, additions and repurposing of previously installed equipment it is very likely that the original networking topology-link map will become more and more out-of-date, and thus simply fail to accurately represent the current topology of the network. Moreover, the original networking topology-link map is merely a static drawing, and as such, it does not enable maintaining a real-time view of the networking equipment in a data network, and/or provide any indication of how the networking equipment is connected and is being utilized.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings. The appended drawings, however, illustrate only some example features of the present disclosure and are therefore not to be considered limiting, for the description may admit to other effective features.

Figure 1A:
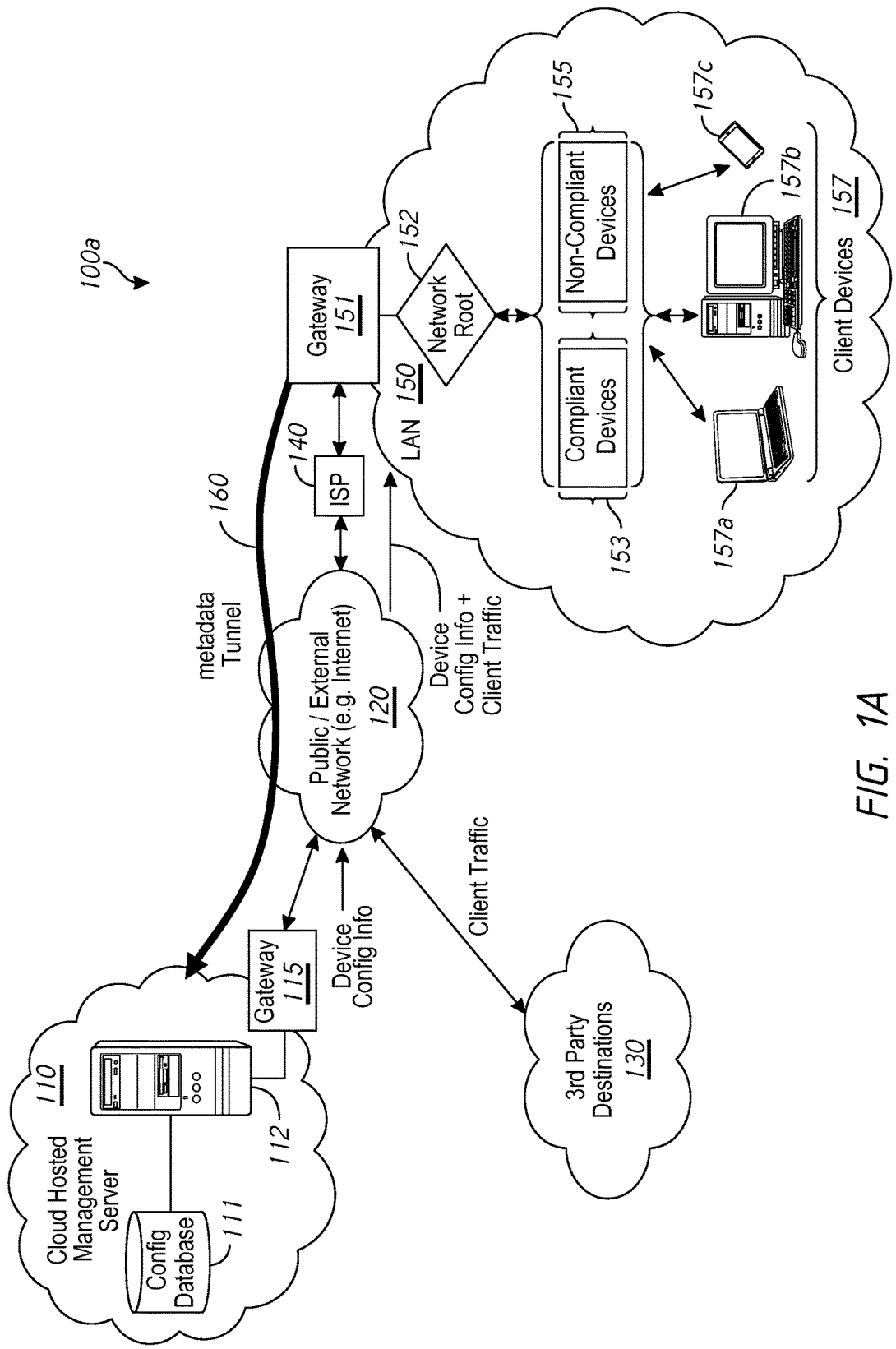
FIG. 1A is a block diagram of a data networking environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Previously available network monitoring and management systems fail to provide systems or processes that adequately enable discovery a network topology that includes both compliant and non-compliant networking devices. By contrast, and to that end, various implementations disclosed herein include systems, methods and apparatuses that determine whether or not a loop exists within uplink metadata associated with first and second compliant devices, wherein the loop in the uplink metadata is characterized by pointers provided to indicate that the first and second compliant devices operate to send externally addressed traffic to one another contrary to the operation of the first and second compliant devices within a network; and resolve the loop by adding a non-compliant device to topology-link map data associated with the first and second compliant devices in response to determining the existence of the loop, wherein the topology-link map data archives accessible information about the topology of the network based at least on the uplink metadata.

Various implementations disclosed herein include systems, methods and apparatuses that determine connections between disconnected partial trees. For example, in some implementations, a method includes obtaining a respective device identifier of a first network device included in a first one of a plurality of partial trees included in a network, wherein each partial tree includes at least one network device, and connectivity from the at least one network device to other partial trees is undefined based on associated uplink metadata; querying a plurality of compliant devices within the plurality of partial trees in order to trace a path traversal of the respective device identifier within the network; and selecting one of the plurality of compliant devices as connecting the first network device to a second one of the plurality of partial trees based at least on query responses provided by the plurality of compliant devices.

Various implementations disclosed herein include systems, methods and apparatuses that determine connections of non-external network facing ports. For example, in some implementations, a method includes identifying one or more port pair connections between non-external network facing ports associated with respective pairs of compliant devices based at least on associated uplink metadata, wherein the respective pairs of compliant devices are included in a plurality of compliant devices within a network; determining the respective status of each compliant device associated with a particular one of the one or more port pair connections; and adding link data for a particular one of the one or more port pair connections to topology-link map data based at least on the determined respective status of each compliant device associated with the particular one of the one or more port pair connections, wherein the topology-link map data archives accessible information about the topology of the network based at least on the uplink metadata.

FIG. 1A is a block diagram of a data networking environment 100a in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the data networking environment 100a includes a public/external network 120 (e.g., a portion of the Internet), one or more third-party destinations 130 (e.g., providing various third-party content and services), a cloud hosted network management system 110, an optional Internet service provider (ISP) node 150 and a local area network (LAN) 150.

The one or more third-party destinations 130 provide various third-party content and services, such as email, media content, online banking, social networking servers, etc. Other than providing sources and/or destinations for client data traffic, the details of the one or more third-party destinations 130 are not particularly pertinent to the scope of the present disclosure. As such, no further details pertaining to the one or more third-party destinations 130 are provided for the sake of brevity.

In various implementations, the LAN 150 includes a gateway node 151, a network root node 152, a number of compliant networking devices 153, a number of non-compliant networking devices 155, and a number of client devices 157. The gateway device 151 connects the LAN 150 to the public network 120 through the optional ISP node 140, and includes features such as a firewall. In some implementations, the gateway device 151 is provided as a single entity (e.g., a server, a virtual machine, etc.). In some implementations, the gateway device 151 includes a distributed system including a suitable combination of software, data structures, virtual machines, computing devices, servers, switches and routers. Merely for the sake of brevity and convenience of explanation, the gateway device 151 is described herein as a single entity.

In some implementations, the root node 152 is a virtual node or logical place-holder within the LAN 150. In such instances, the root node 152 merely provides a convenient LAN node that is separate from the gateway node 151. In some implementations, the root node 152 is an actual physical device that is separate from the gateway node 151. In some implementations, the root node 152 is included as a part of the gateway node 151.

Client devices 157 generally include any suitable computing device, such as a computer, a laptop computer, a tablet device, a netbook, an internet kiosk, a personal digital assistant, a mobile phone, a smartphone, a wearable, a gaming device, a computer server, etc. In some implementations, each client device (e.g., laptop 157a, workstation 157b, smartphone 157c, etc.) includes one or more processors, one or more types of memory, a display and/or other user interface components such as a keyboard, a touch screen display, a mouse, a track-pad, a digital camera and/or any number of supplemental devices to add functionality. In some implementations, a client device includes a suitable combination of hardware, software and firmware configured to provide at least some of protocol processing, modulation, demodulation, data buffering, power control, routing, switching, clock recovery, amplification, decoding, and error control.

In various implementations, the difference between the compliant networking devices 153 and the non-compliant networking devices 155 is based at least on how uplink metadata is processed by each. A non-compliant device erroneously forwards uplink metadata received from one compliant device to another, even though the non-compliant device correctly routes externally addressed traffic received from the compliant devices. That is, while a non-compliant device correctly routes externally addressed traffic towards the gateway node 151, the non-compliant device also incorrectly forwards uplink metadata because it is not configured to recognize and process uplink metadata properly. By contrast, a compliant device in the hypothetical place of a non-compliant device is configured to recognize uplink metadata as information it should use and not forward from one compliant device to another device. However, in response to a request to do so, compliant devices report their own uplink metadata (e.g., such as LLDP frames) to a requesting device. To that end, in accordance with some implementations, a metadata tunnel 160 is established from the gateway node 151 of the LAN 150 to the gateway node 115 of the cloud hosted network management system 110.

The cloud hosted network management system 110 is configured to manage the configuration and operation of compliant devices in a LAN and/or across geographically distributed portions of a VLAN. To that end, the cloud hosted network management system 110 includes a configuration database 111, a cloud hosted management server 112, and a gateway device 115. The gateway device 115 connects the cloud hosted management server 112 to the public network 120 so that the cloud hosted management server 112 is able to communicate with one or more LANs and/or geographically distributed portions of a VLAN, and includes features such as a firewall. In some implementations, the gateway device 115 is provided as a single entity (e.g., a server, a virtual machine, etc.). In some implementations, the gateway device 115 includes a distributed system including a suitable combination of software, data structures, virtual machines, computing devices, servers, switches and routers. Merely for the sake of brevity and convenience of explanation, the gateway device 115 is described herein as a single entity.

In some implementations, the ISP node 140 is provided to link the LAN 150 to the public network 120. Similar to the gateway devices 115,151, in various implementations, the ISP node 150 is provided as a single entity (e.g., a server, a virtual machine, etc.). In some implementations, the ISP node 150 is implemented as a distributed system including a suitable combination of software, data structures, virtual machines, computing devices, servers, switches and routers. For the sake of brevity and convenience of explanation, the ISP node 150 is described herein as a single entity.

Figure 1B:
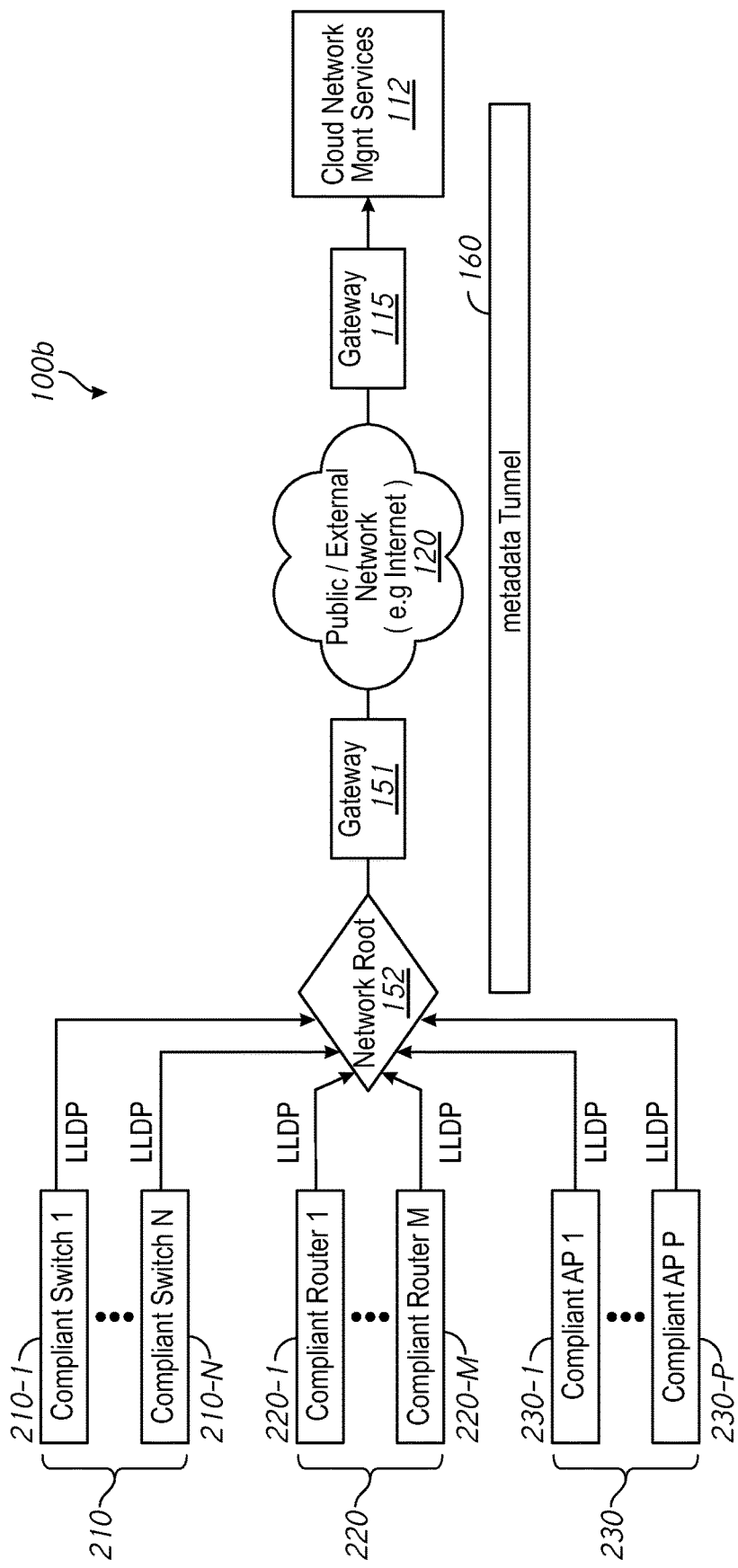
FIG. 1B is a data flow diagram associated with methods of managing a data networking environment in accordance with some implementations.

FIG. 1B is a data flow diagram 100b associated with methods of managing the data networking environment 100a of FIG. 1A in accordance with some implementations. The data flow diagram 100b shown in FIG. 1B is similar to and adapted from the data networking environment 100a shown in FIG. 1A. Elements common to FIGS. 1A and 1B include common reference numbers, and only the differences between FIGS. 1A and 1B are described herein for the sake of brevity. To that end, FIG. 1B illustrates the origination and/or flow of uplink metadata from various types of compliant devices within a LAN and/or within one or more geographically distributed portions of a VLAN. For example, a LAN includes a number of compliant switches 210 (e.g., 210-1, . . . , 210-N), a number of compliant routers 220 (e.g., 220-1, . . . , 220-M), and a number of compliant wireless access points (APs) 230 (e.g., 230-1, . . . , 230-P). In the example shown in FIGS. 1A and 1B, the compliant devices report uplink metadata to at least one of the cloud hosted management server 112 (using the metadata tunnel 160 as appropriate) and the gateway node 151, depending on which device transmitted the reporting request.

Figure 2:
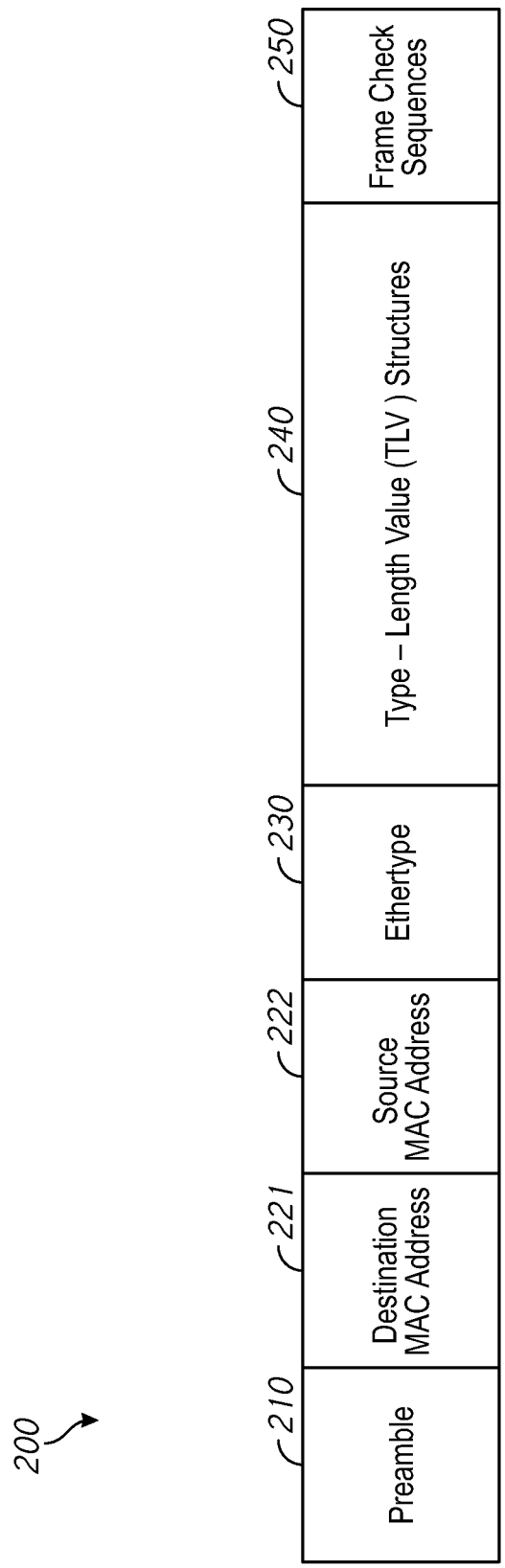
FIG. 2 is a schematic diagram of an example of a conforming uplink reporting frame in accordance with some implementations.

In operation, compliant devices report uplink metadata in one or more conforming frames and/or packets. FIG. 2 is a schematic diagram of an example of a conforming reporting frame 200 in accordance with some implementations. In various implementations, the conforming frame 200 is suitable for use with at least one of a number of link layer discovery protocols, such as LLDP, CDP, EDP, FDP, SONMP, LLTD, etc. For example, as shown in FIG. 2, the conforming frame 200 conforms to an LLDP Ethernet frame, and includes a preamble field 210, a destination MAC (media access control) address field 221, a source MAC address field 222, and Ethertype field 230, a typle-length value (TLV) structures field 240 and a frame check sequences field 250. The destination MAC address field 221 includes the MAC address to which externally addressed traffic is transmitted, and the source MAC address field 222 includes the MAC address of the originator of the frame 200.

Figure 3:
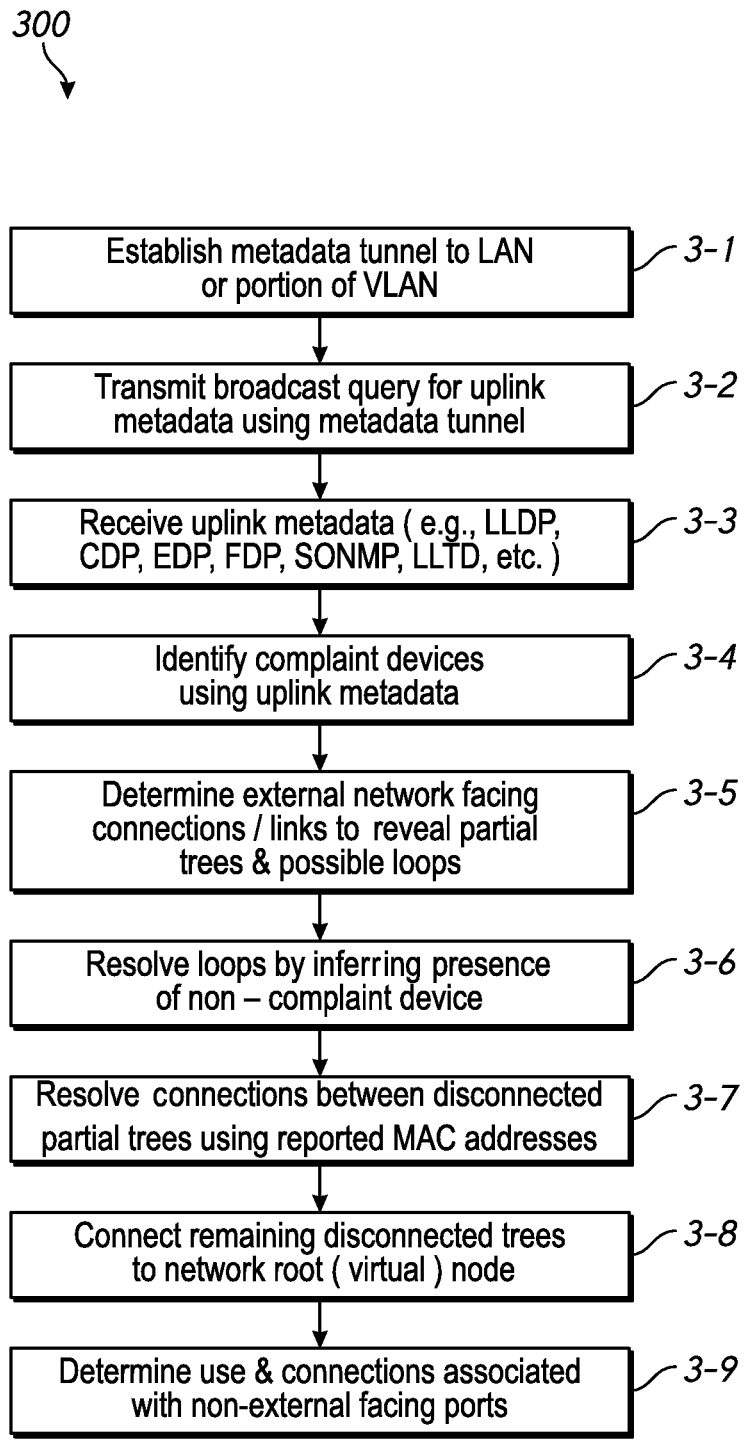
FIG. 3 is a flowchart representation of a method of network topology discovery in accordance with some implementations.

FIG. 3 is a flowchart representation of a method 300 of network topology discovery in accordance with some implementations. For the sake of additional clarity and detail, the method 300 is described with reference to FIG. 1A and FIGS. 4A-4G, which provide progressive illustrations of example topology-link map data associated with various points of the method 300. In some implementations, the method 300 is performed by a network topology module operating on and/or in coordination with a server system (e.g., the cloud hosted management server 112) in order to produce a topology-link map. Additionally and/or alternatively, in some implementations, the method 300 is performed by and/or in coordination with a gateway node (e.g., gateway node 151, or a similarly situated node) of a LAN and/or a portion of a VLAN in order to produce a topology-link map of network devices that communicate through the gateway node.

Briefly, the method 300 includes identifying compliant devices using reported uplink metadata, resolving erroneous loops between identified compliant devices, resolving the connections between two or more partial trees including identified and inferred devices, and determining the connections and utilization of non-external facing ports of identified devices. To that end, as represented by block 3-1, the method 300 optionally includes establishing a metadata tunnel to a LAN or a portion of a VLAN. For example, with reference to FIG. 1, the cloud hosted management server 112 establishes the metadata tunnel 160 to the LAN 150. As noted above, the metadata tunnel 160 extends between the gateway 115 of the cloud hosted management system 110 and the gateway node 151 of the LAN 150, through portions of the Internet 120 and the infrastructure of the ISP 140.

As represented by block 3-2, the method 300 includes transmitting a broadcast query for uplink metadata using the metadata tunnel or from a local gateway node. For example, again with reference to FIG. 1, the cloud hosted management server 112 produces and transmits a broadcast query through the metadata tunnel 160, which is received by the gateway node 151. The gateway node 151 then broadcasts the query to all of the compliant and non-compliant devices 153, 155 in the LAN 150 through the network root node 152. In another example, when the method 300 is performed locally by and/or in coordination with a gateway node of a LAN, the gateway node 151 produces and transmits a broadcast query for uplink metadata without utilizing a metadata tunnel to a system or device external to the LAN.

As represented by block 3-3, the method 300 includes receiving uplink metadata from compliant devices (e.g., compliant devices 153) within the LAN. In other words, the method 300 includes receiving information from the networking devices within a LAN that are configured to report uplink information in response to receiving a suitable reporting request, such as the broadcast query. In various implementations, uplink information is provided in a conforming frame that includes a first device identifier of the reporting device, a port identifier of the port of the reporting device that is used for transmitting externally addressed traffic, and optionally a second device identifier of a device that is connected to the port. In various implementations, the uplink metadata from compliant devices conforms to at least one of a number of link layer discovery protocols, such as LLDP, CDP, EDP, FDP, SONMP, LLTD, etc. Non-compliant devices (e.g., non-compliant devices 155) are not configured to properly respond to a reporting request, and will often ignore the request. However, in some instances, a non-compliant device may respond with an error packet that includes at least one of its own device identifier, its IP address, and its MAC address.

Figure 4A:
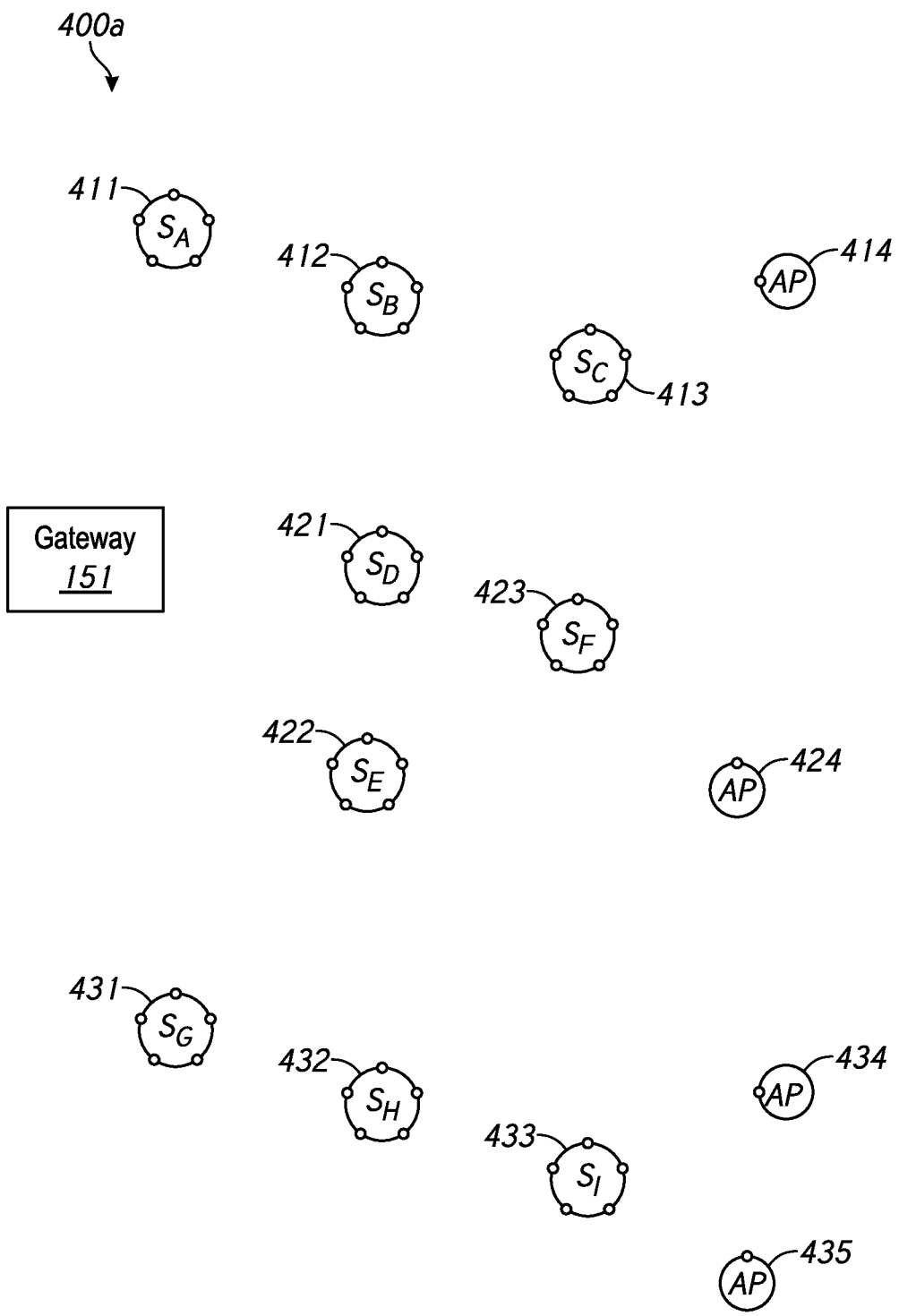
FIGS. 4A-4G are progressive illustrations of topology-link map data at various points in a network topology discovery process in accordance with some implementations.
Figure 4B:
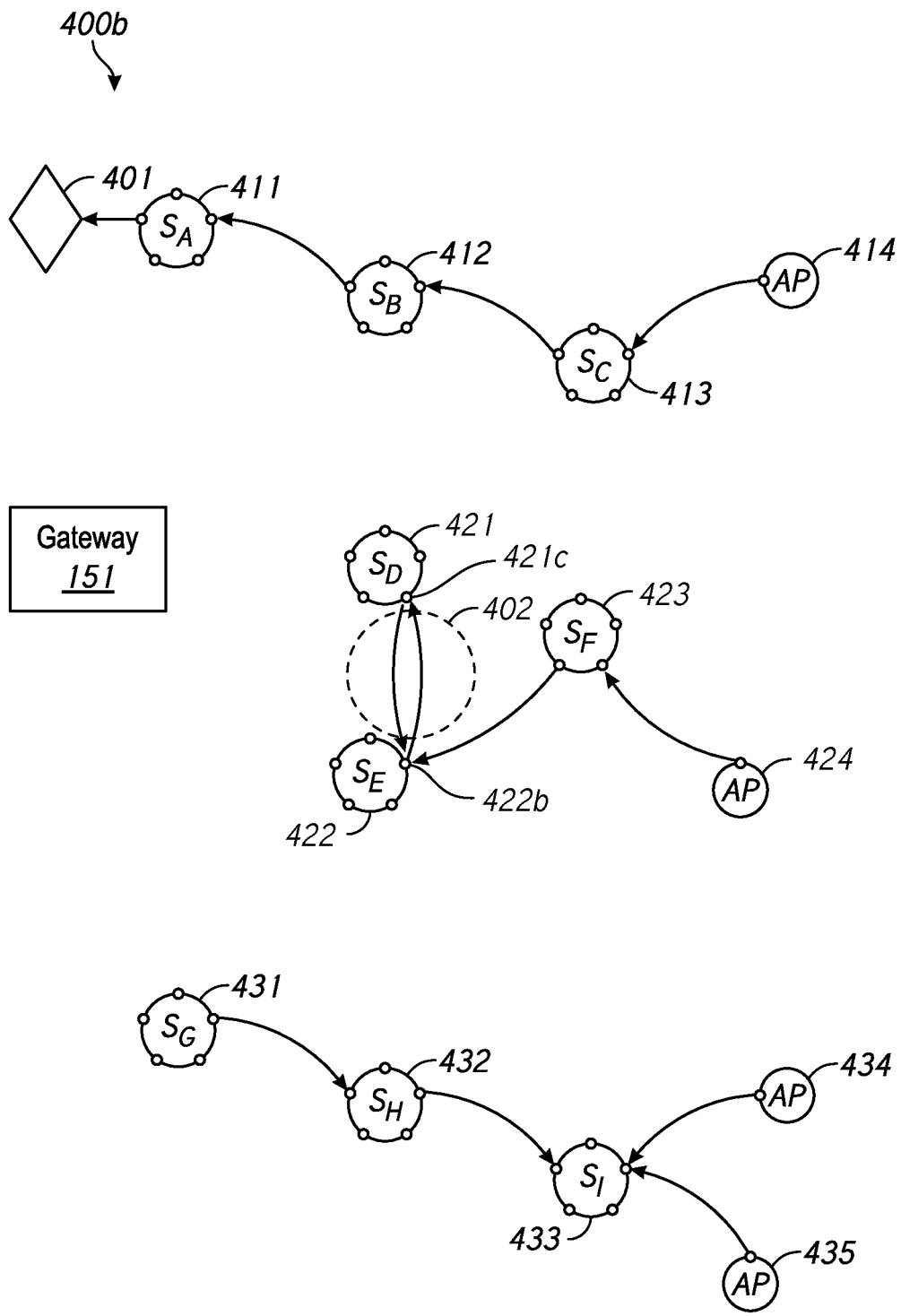
Figure 4C:
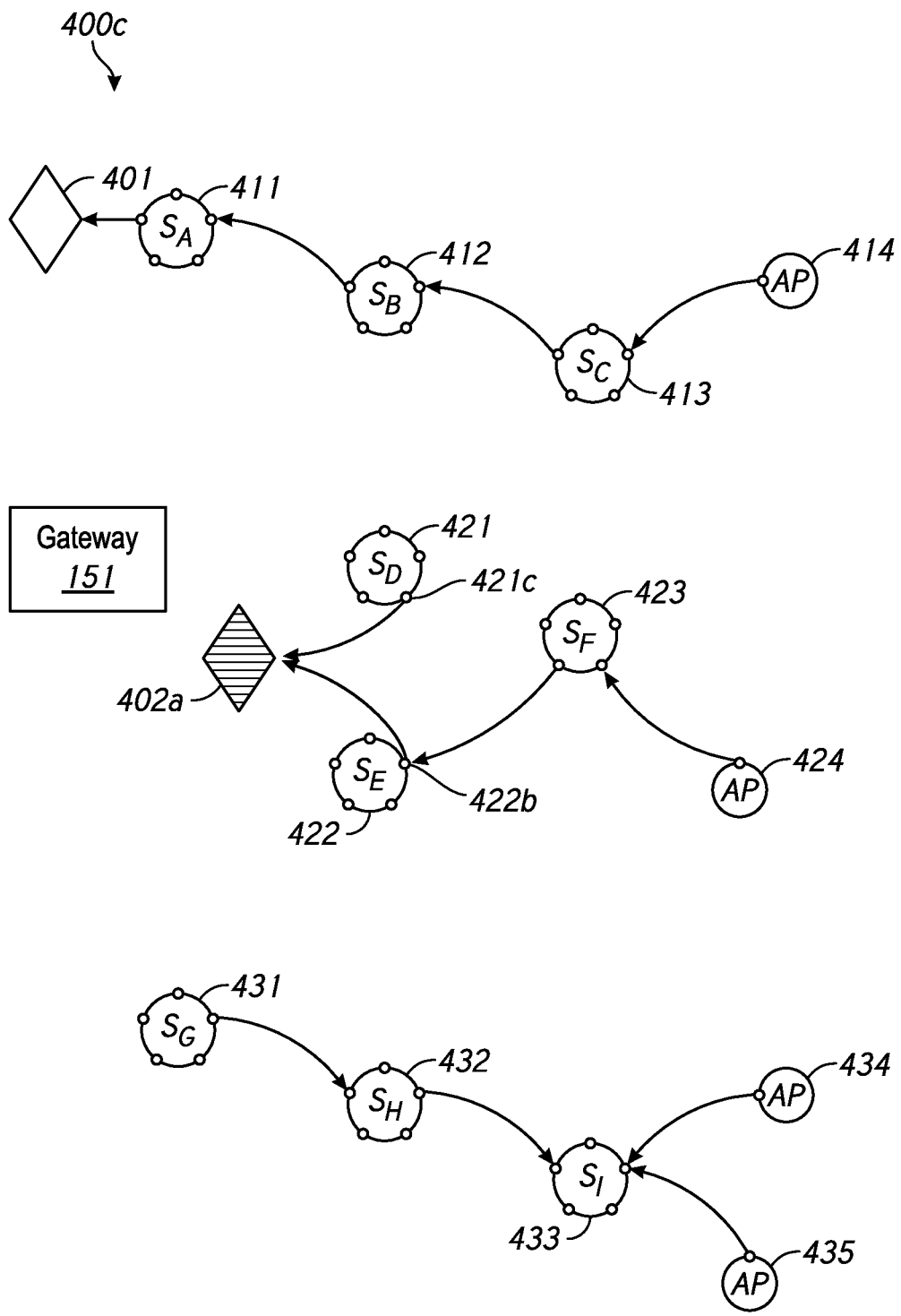
Figure 4D:
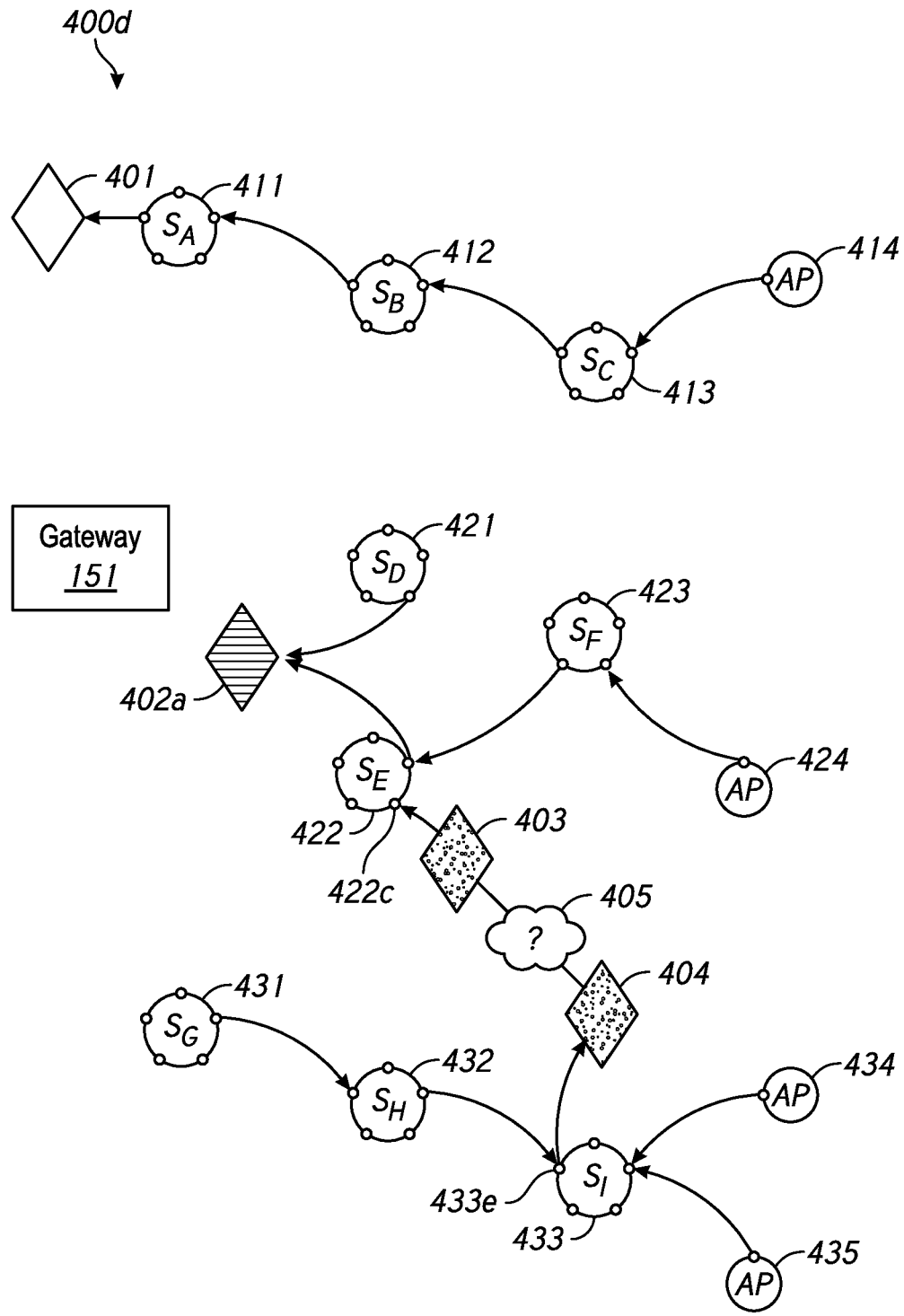
Figure 4E:
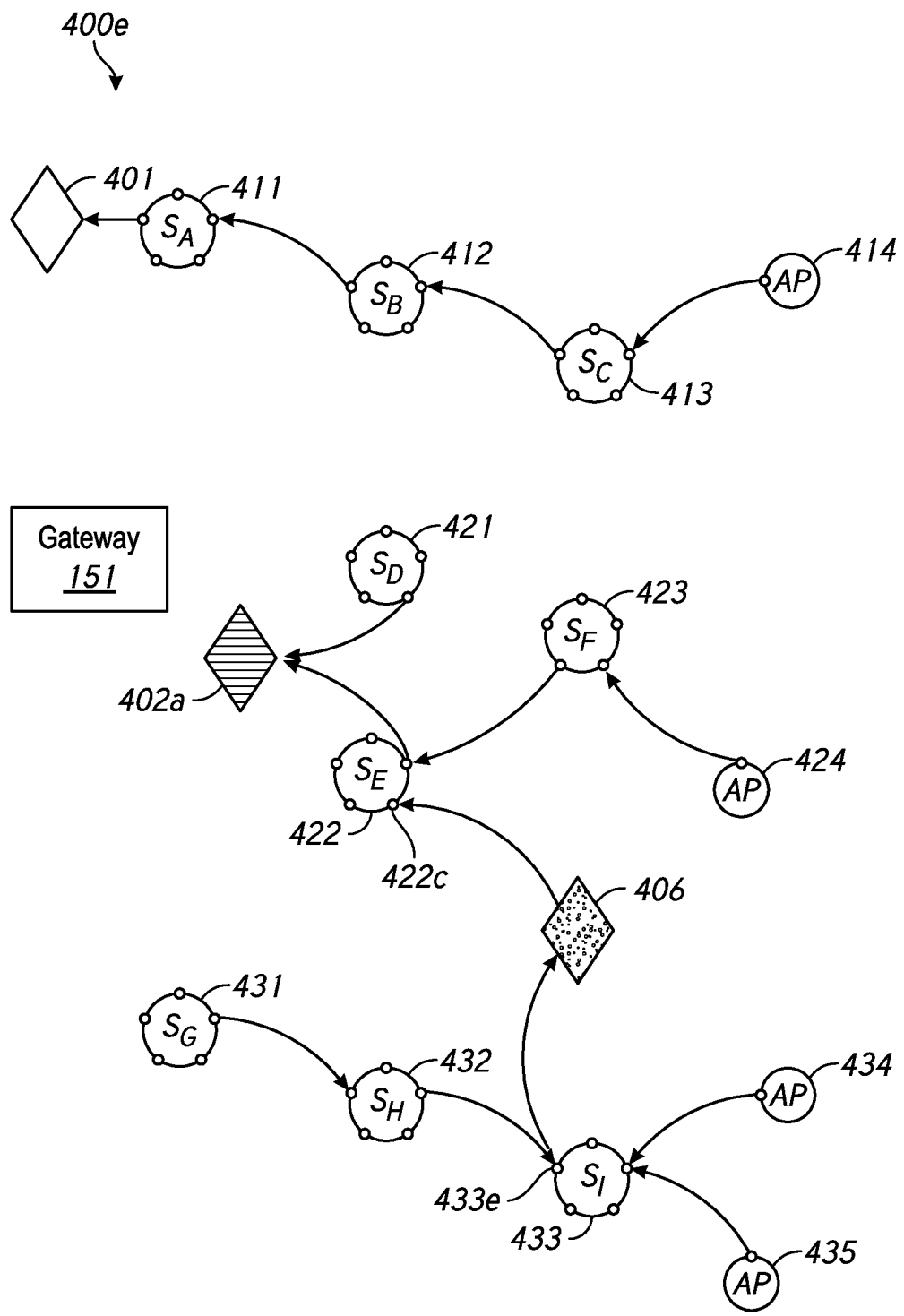
Figure 4F:
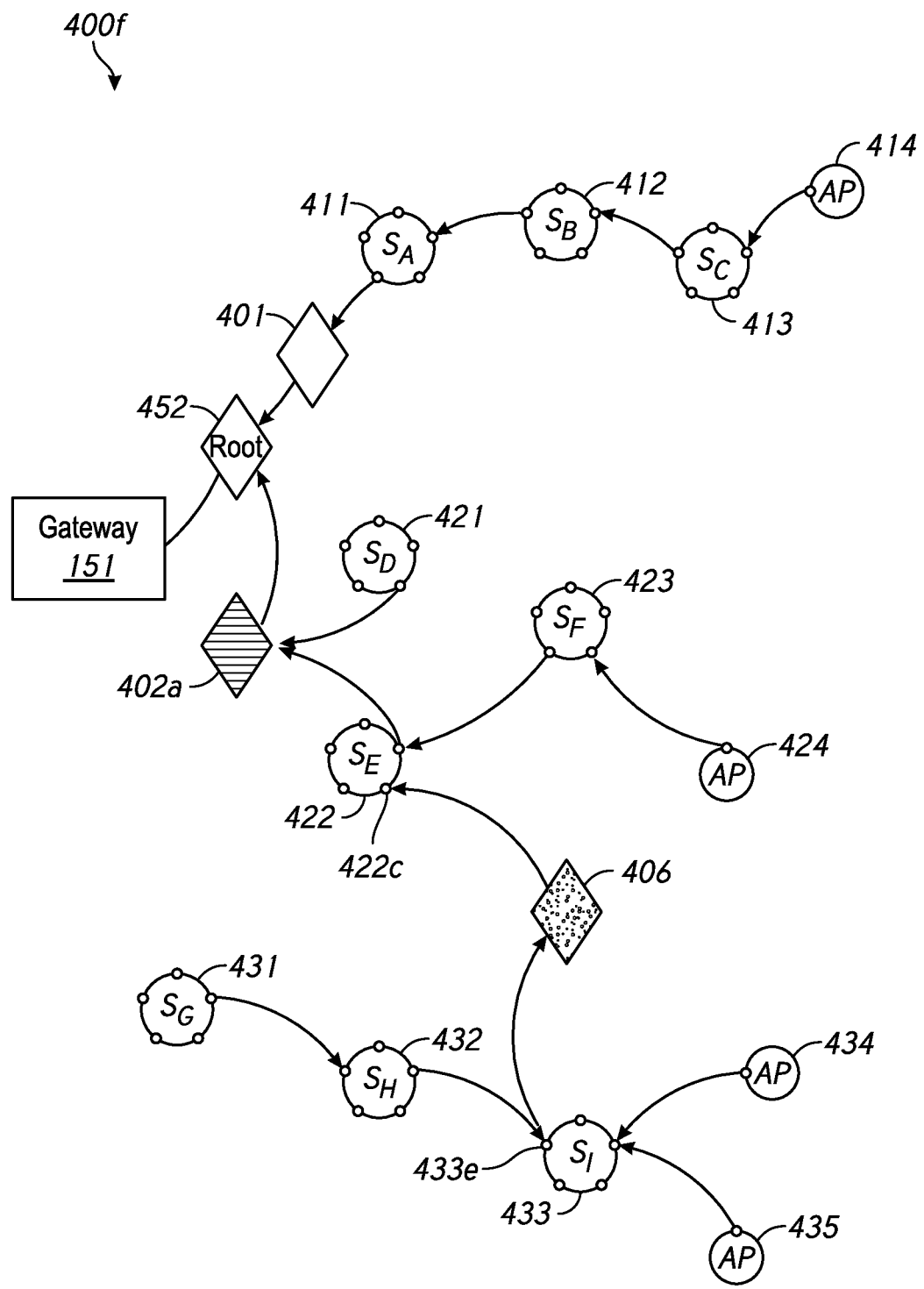
Figure 4G:
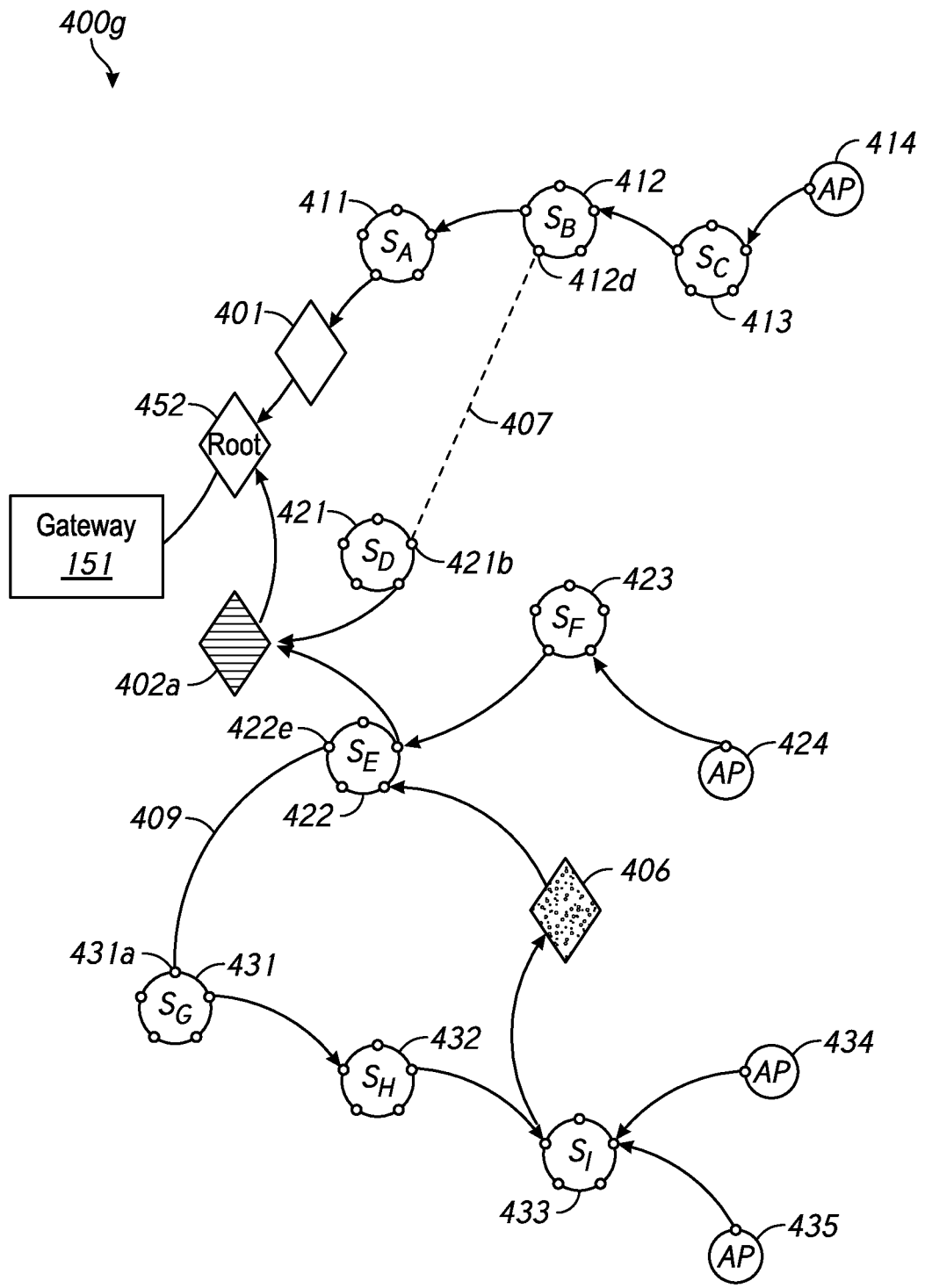

As represented by block 3-4, the method 300 includes identifying the compliant devices within the LAN using the uplink metadata reported from the compliant devices. As noted above, a compliant device will respond to a reporting request with a conforming frame that includes a device ID. Accordingly, the requesting device (e.g., the cloud hosted management server 112 or the gateway node 151) is able to identify at least the normally operating compliant devices within the LAN using the received uplink metadata. For example, referring to FIG. 4A, a first view 400a of topology-link map data shows a number of compliant networking devices without connectivity information. In particular, the first view 400a includes the gateway node 151, a number of compliant switches 411, 412, 413, 421, 422, 423, 431, 432, 433 (also labelled $S_A$, $S_B$, $S_C$, $S_D$, $S_E$, $S_F$, $S_G$, $S_H$, $S_I$, respectively), and a number of wireless APs 414, 424, 434, 435. With respect to the first view 400a, performance of the method 300 thus far has not yet determined any connections between the gateway node 151, the compliant switches 411, 412, 413, 421, 422, 423 and the wireless APs 414, 424, 434, 435. Moreover, those of ordinary skill in the art will appreciate from the present disclosure that, while nine switches and four APs are illustrated in FIG. 4A, in various implementations a LAN or a portion of a VLAN includes any number of compliant networking devices including, but not limited to, gateway devices, routers, switches, repeaters, security appliances, firewall devices, servers, wireless APs, client devices. Also, in some implementations, the requesting device is also able to identify non-compliant devices from the aforementioned error packets.

As represented by block 3-5, the method 300 includes determining or identifying the external facing ports for each of the identified compliant devices in order to reveal partial network tree structures (i.e., herein after "partial trees") and possible loops. As understood by those of ordinary skill in the art, an external facing port is the port that a device uses to transmit externally addressed traffic towards a gateway node. Continuing with the example, and now referring to FIG. 4B, a second view 400b of the topology-link map data shows the compliant networking devices grouped into partial trees. More specifically, the second view 400b shows that the compliant switches 411, 412, 413 ($S_A$, $S_B$, $S_C$) and AP 414 together form a first partial tree, which terminates at a newly identified non-compliant node 401. In particular, in this example, the method 300 includes parsing the uplink metadata to reveal that the AP 414 transmits externally addressed traffic to the compliant switch 413. And that, in turn, the compliant switch 413 transmits externally addressed traffic to the compliant switch 412, which then directs externally addressed traffic to the compliant switch 411, and so on to the non-compliant node 401.

Similarly, the second view 400b also shows that the compliant switches 421, 422, 423 ($S_D$, $S_E$, $S_F$) and AP 414 are connected in a second partial tree, and that the compliant switches 431, 432, 433 ($S_G$, $S_H$, $S_I$) and the APs 434, 435 are connected in a third partial tree. With respect to the third partial tree, in this example, the method 300 includes parsing the uplink metadata to reveal that the APs 434, 435 each transmit externally addressed traffic to the compliant switch 433. And that, the compliant switch 431 transmits externally addressed traffic to the compliant switch 432, which then directs externally addressed traffic to the compliant switch 433—which is the extent of the third partial tree topology information discovered thus far by performance of the method 300.

Referring again to the second partial tree, in this example, the method 300 includes parsing the uplink metadata to reveal that the AP 424 transmits externally addressed traffic to the compliant switch 423. The compliant switch 423 transmits externally addressed traffic to the compliant switch 422. However, according to the uplink metadata, the compliant switch 422 and the compliant switch 421 point to one another, implying that each transmits externally addressed traffic to the other within the loop 402. If such a loop actually existed in the LAN, the compliant devices associated with the loop would not have been able to report the uplink metadata to the requesting device because externally addressed traffic would be trapped in the loop. In most instances, a loop does not actually exist in the LAN, and thus the loop 402 is likely an artifact or reporting error caused by a yet to be identified non-compliant device associated with the compliant switches 421, 422.

As represented by block 3-6, the method 300 includes resolving loops in one or more of the partial trees by inferring the presence of a non-compliant device. Continuing with the example, and now with reference to FIG. 4C, a third view 400c of the topology-link map data shows an inferred non-compliant device 402a in place of the loop 402. More specifically, the method 300 includes overwriting the respective port pointers of the compliant switches 421, 422 so that each points to the inferred non-compliant device 402a. As such, the third view 400c of the topology-link map data shows a more likely topology than the second view 400b that included the loop 402. A more detailed method of resolving loops caused by non-compliant devices is described below with reference to FIG. 5.

As represented by block 3-7, the method 300 includes resolving connections between two or more partial trees using MAC addresses. Continuing with the example, and now with reference to FIGS. 4D and 4E, fourth and fifth views 400d, 400e of the topology-link map data are shown that each include possible topology-links that could evolve from the third view 400c. With respect to FIG. 4D, in one evolution of the example, at least two non-compliant nodes 403, 404 link port 433e of the compliant switch 433 to port 422c of the compliant switch 422, with one or more other unknown nodes 405 (or even networks) linking the two non-compliant nodes 403, 404. With respect to FIG. 4E, in another evolution of the example, a single non-compliant node 406 links port 433e of the compliant switch 433 to port 422c of the compliant switch 422. The process of determining the characteristics of the link between two compliant nodes on separate partial trees is referred to as link discovery herein. A more detailed method of connecting partial trees is described below with reference to FIG. 6. And a more detailed method of link discovery is described below with reference to FIG. 7.

As represented by block 3-8, the method 300 includes connecting the remaining disconnected trees to a network root node. Continuing with the example, and now with reference to FIG. 4F, a sixth view 400f of the topology-link map data shows a network root node 452 introduced to connect any disconnected trees that remain after performance of the prior portions of the method 300. In some implementations, the root node 452 is a virtual node or logical place-holder. In such instances, the root node 452 merely provides a convenient LAN node that is separate from the gateway node 151. In some implementations, the root node 452 is an actual device that is separate from the gateway node 151. In some implementations, the root node 452 is included as a part of the gateway node 151.

As represented by block 3-9, the method 300 includes determining the use and connections associated with non-external facing ports. Continuing with the example, and now with reference to FIG. 4G, a seventh view 400g of the topology-link map data shows example connections between non-external facing ports. For example, a non-external facing connection 407 exists between port 421b of the compliant switch 421 and port 412d of the compliant switch 412. In another example, another non-external facing connection 409 exists between port 431a of the compliant switch 431 and port 422e of the compliant switch 422. A more detailed method of determining the use and connections associated with non-external facing ports is described below with reference to FIG. 8, along with a more detailed description of the non-external facing connections 407, 409.

Figure 5:
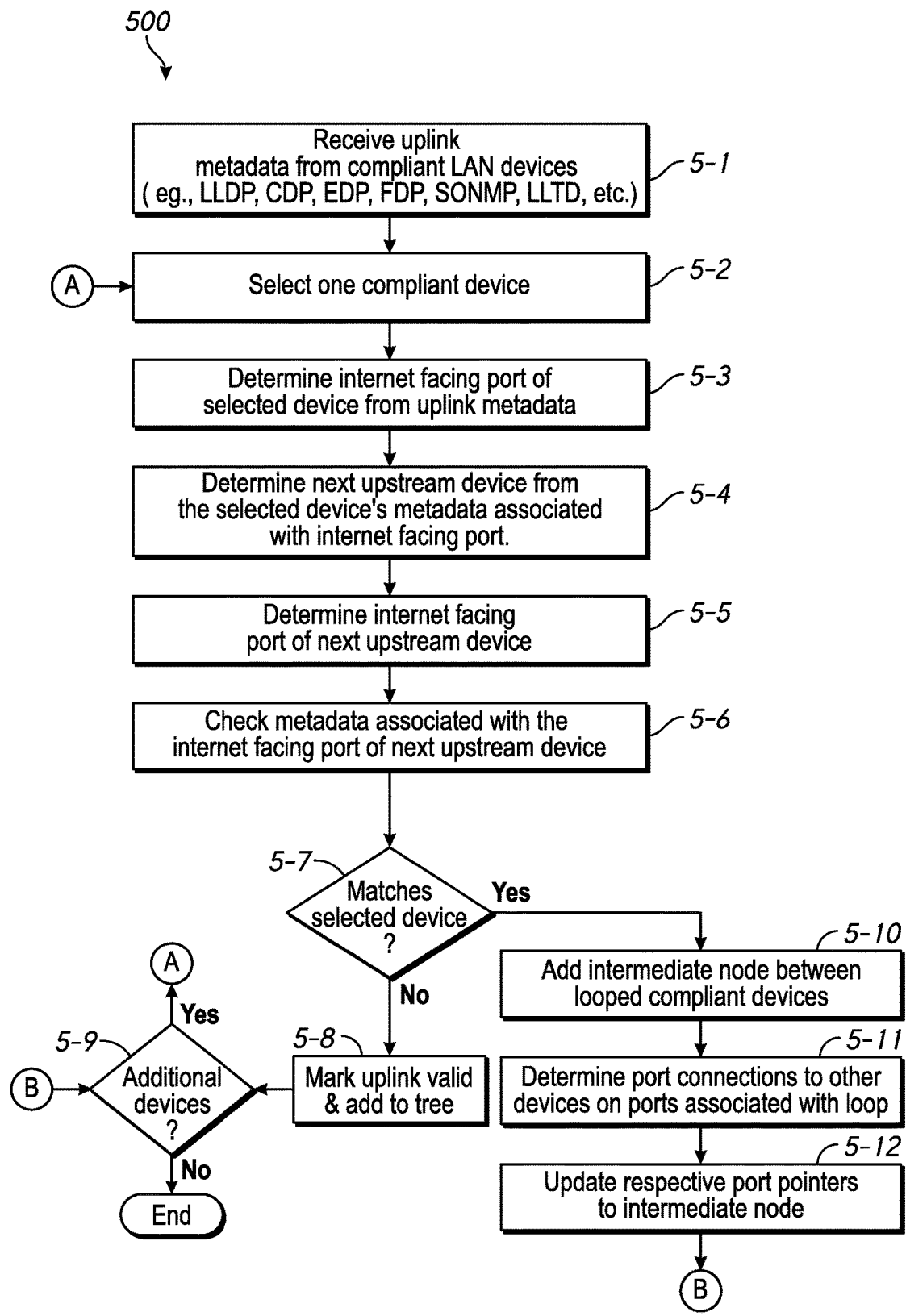
FIG. 5 is a flowchart representation of a method of resolving connectivity loops in network topology-link map data in accordance with some implementations.

FIG. 5 is a flowchart representation of a method 500 of resolving erroneous connectivity loops in topology-link map data in accordance with some implementations. For the sake of additional clarity and detail, the method 500 is described with reference to FIGS. 1A, 4B, and 4C introduced above. In some implementations, the method 500 is performed by a network topology module operating on and/or in coordination with a server system (e.g., cloud hosted management server 112). Additionally and/or alternatively, in some implementations, the method 500 is performed by and/or in coordination with a gateway node (e.g., gateway node 151) of a LAN and/or a portion of a VLAN.

Briefly, the method 500 includes determining whether or not a loop exists within uplink metadata associated with first and second compliant devices, and resolving the loop by adding a non-compliant device to topology-link map data associated with the first and second compliant devices. In some implementations, the loop in the uplink metadata is characterized by pointers provided to indicate that the first and second compliant devices operate to send externally addressed traffic to one another contrary to the operation of the first and second compliant devices within a network. In some implementations, the topology-link map data archives accessible information about the topology of the network based at least on the uplink metadata.

To that end, as represented by block 5-1, the method 500 includes receiving uplink metadata reported by compliant devices (e.g., compliant devices 153) within the LAN, as described above with reference to FIG. 3. Similar to the method 300, compliant devices (and in some cases non-compliant devices) are identified from the received uplink metadata (and possibly error packets from non-compliant devices). As represented by block 5-2, the method 500 includes selecting one compliant device in order to evaluate the external-network facing port (i.e., often the Internet-facing port) of the selected device. For example, with reference to FIG. 4B, the compliant switch 421 ($S_D$) is selected. Those of ordinary skill in the art will appreciate from the present disclosure that the compliant switch 421 has been chosen for this example for the sake of brevity, because, as introduced above, the compliant switch 421 is associated with the loop 402. However, those of ordinary skill in the art will recognize that performance of the method 500 will result in the identification of one or more loops irrespective of which compliant device is selected first, and in some implementations, irrespective of whether a compliant device is selected first.

As represented by block 5-3, the method 500 includes determining or identifying the Internet-facing port of the selected device using the uplink metadata received from the selected device. For example, with reference to FIG. 4B, the Internet-facing port 421c of the compliant switch 421 is illustrated with an arrow emanating from it towards the compliant switch 422. As represented by block 5-4, the method 500 includes determining or identifying the next upstream device associated with the identified Internet-facing port as indicated by the uplink metadata. For example, with reference to FIG. 4B, the next upstream device is the compliant switch 422 ($S_E$). As represented by block 5-5, the method 500 includes determining or identifying the Internet-facing port of the next upstream device (relative to the selected device) using the uplink metadata received from the next upstream device. For example, with reference to FIG. 4B, the Internet-facing port 422b of the compliant switch 422 is illustrated with an arrow emanating from it towards the compliant switch 421. As represented by block 5-6, the method 500 includes checking the uplink metadata associated with the Internet-facing port of the next upstream device (relative to the selected device) in order to identify the target device to which externally addressed data is sent, at least according to the reported uplink metadata, which may not accurately reflect the true operation of the devices.

As represented by block 5-7, the method 500 includes determining whether or not the target device identified using the uplink metadata received from the next upstream device matches the selected device (i.e., target device=selected device?). If the target device does not match the selected device ("No" path from block 5-7), as represented by block 5-8, the method 500 includes marking or recording that the uplink metadata received from the selected device as valid and adding that information to respective topology tree information. In turn, as represented by block 5-9, the method 500 includes determining whether or not there are additional compliant devices to consider in the search for loops in the reported uplink metadata. If there are additional devices to consider ("Yes" path from block 5-9), the method 500 loops back to the portion of the method represented by block 5-2. On the other hand, if there are no additional devices to consider ("No" path from block 5-9), the method 500 ends with the assumption that all the loops have been found and resolved in accordance with some implementations.

Referring again to block 5-7, if the target device matches the selected device ("Yes" path from block 5-7), a loop exists in the uplink metadata because, according to the received uplink metadata, the selected device and the identified next upstream device appear to be directing externally addressed traffic to one another. For example, with reference to FIG. 4B, according to the uplink metadata, the compliant switch 422 and the compliant switch 421 point to one another, implying that each transmits externally addressed traffic to the other within the loop 402. If the loop 402 actually existed in the LAN, the compliant devices associated with the loop would not have been able to report the uplink metadata to the requesting device because externally addressed traffic would be trapped in the loop 402. In most instances, the loop 402 does not actually exist in the LAN, and the loop 402 is usually an artifact or reporting error caused by a yet to be identified non-compliant device arranged in association with the compliant switches 421, 422. In particular, the loop is caused by a non-compliant device erroneously forwarding metadata from one compliant device (e.g., compliant switch 422) to another compliant device (e.g., compliant switch 421) and vice versa, even though each of the compliant devices directs externally addressed traffic to the non-compliant device. In other words, while the non-compliant device correctly routes externally addressed traffic, the non-compliant devices incorrectly forwards uplink metadata because it is not configured to recognize and process the uplink metadata properly. By contrast, a compliant device in the hypothetical place of the non-compliant device is configured to recognize the uplink metadata as information it should use and not forward the uplink metadata received from one compliant device to another device.

As represented by block 5-10, the method 500 includes adding an intermediate non-compliant device (node) between the looped compliant devices into the topology-link map data. In other words, the loop is resolved by inferring the presence of a non-compliant device based on the error. Continuing with the example, and now with reference to FIG. 4C, a third view 400c of the topology-link map data shows the aforementioned inferred non-compliant device 402a in place of the loop 402. As represented by block 5-11, the method 500 includes determining the port connections to other devices on ports associated with the loop in order to remove remaining artifacts of the loop from the topology-link map data. For example, the method 500 includes overwriting the respective port pointers of the ports 421c, 422b so that each points to the inferred non-compliant device 402a. As such, the third view 400c of the topology-link map data shows a more likely topology than the second view 400b that included the loop 402. As represented by block 5-12, the method 500 also includes updating the port pointers of the intermediate non-compliant device node in the associated topology-link map metadata.

Figure 6:
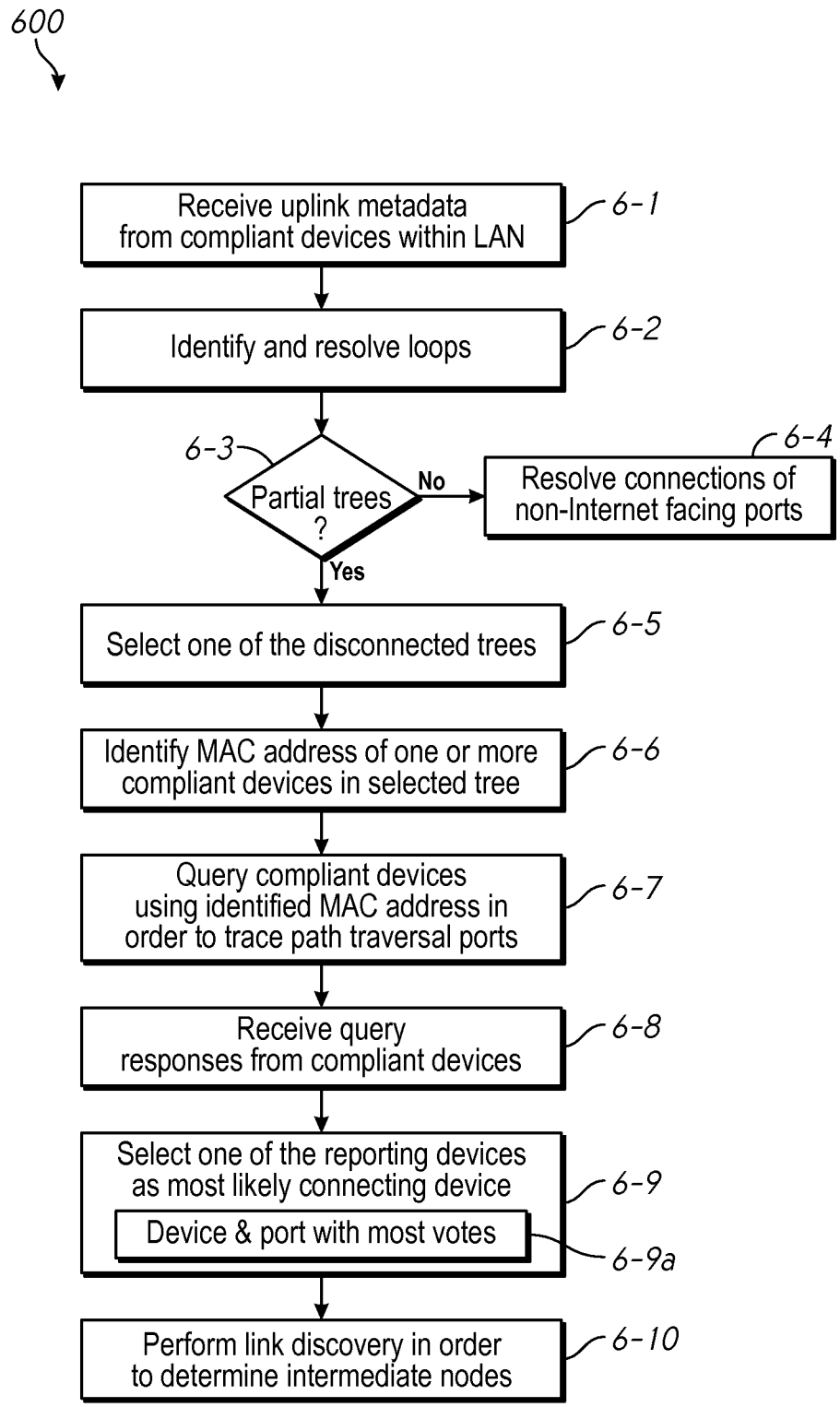
FIG. 6 is a flowchart representation of a method of linking disconnected partial trees in network topology-link map data in accordance with some implementations.

FIG. 6 is a flowchart representation of a method 600 of linking disconnected partial trees in network topology-link map data in accordance with some implementations. For the sake of additional clarity and detail, the method 600 is described with reference to FIGS. 1A, 4D, and 4E introduced above. In some implementations, the method 600 is performed by a network topology module operating on and/or in coordination with a server system (e.g., cloud hosted management server 112). In some implementations, the method 600 is performed by and/or in coordination with a gateway node (e.g., gateway node 151) of a LAN and/or a portion of a VLAN. Briefly, the method 600 includes tracing a path traversal of a device identifier of a device in one partial tree in order to select one of the plurality of compliant devices as connecting the first network device to another partial tree.

To that end, as represented by block 6-1, the method 600 includes receiving uplink metadata from compliant devices (e.g., compliant devices 153) within the LAN, as described above. Similar to the methods 300 and 500, compliant devices (and in some cases non-compliant devices) are identified from the received uplink metadata (and possibly error packets in the case of non-compliant devices). As represented by block 6-2, the method 600 includes identifying and resolving loops, for example, as described above with reference to method 500 of FIG. 5.

As represented by block 6-3, the method 600 includes determining whether or not the uplink metadata from the reporting compliant devices includes two or more partial trees. A partial tree is a group of compliant and/or non-compliant devices for which connectivity data amongst the group is known, but connections with the group to/from one or more other groups is unknowable or unclear from the reported uplink metadata alone. In other words, a partial tree is a connected set of nodes for which routing connections, within topology-link map data, to one or more other sets of nodes is undetermined from the received uplink metadata. If there are no partial trees ("No" path from block 6-3), as represented by block 6-4, the method 600 includes resolving connections of non-Internet facing ports, or concluding operation of the method at this point in accordance with some implementations. As previously noted, a more detailed method of determining the use and connections associated with non-external facing ports (e.g., non-Internet facing ports) is described below with reference to FIG. 8, along with a more detailed description of the non-external facing connections 407, 409.

On the other hand, if there are partial trees ("Yes" path from block 6-3), the method 600 includes initiating a process to link two or more disconnected partial trees in network topology-link map data using information other than the uplink metadata reported by the compliant devices. To that end, as represented by block 6-5, the method 600 includes selecting one of the disconnected partial trees. For example, with reference to FIGS. 4D and 4E, the third partial tree is selected, which includes the compliant switches 431, 432, 433 ($S_G$, $S_H$, $S_I$) and the APs 434, 435. As represented by block 6-5, the method 600 includes identifying the MAC address of one or more of the compliant devices on the selected partial tree. For example, with reference to FIGS. 4D and 4E, the MAC address of the compliant switch 433 ($S_I$) is identified, by for example, further parsing of a conforming frame including the uplink metadata from the compliant switch. For example, as discussed above with reference to FIG. 2, the conforming LLDP packet 200 includes a source MAC address field 222, which includes the MAC address of the device that originated the LLDP packet 200.

As represented by block 6-7, the method 600 includes querying some or substantially all of the reporting compliant devices in order to trace a path traversal associated with the ports of each reporting compliant device. In other words, the query requests that each compliant device provide a response that includes whether or not the compliant device has received packets that include the one or more of the identified MAC address(es) from the selected partial tree, and if so, on which port of the were such packets received. As represented by block 6-8, the method 600 includes receiving the responses from the reporting compliant devices. As represented by block 6-9, the method 600 includes selecting the most likely reporting compliant device that connects to the selected partial tree based on the responses received from the reporting compliant devices. In some implementations, as represented by block 6-9a, the method includes selecting the reporting compliant device and associated port with the most votes. In other words, the reporting compliant device and associated port that reports having received the one or more identified MAC addresses the most frequently is selected as the most likely device that connects to the selected partial tree. For example, with reference to FIGS. 4D and 4E, the third port 422c of the compliant switch 422 is selected as the most likely connection to the fifth port 433e of the selected compliant switch 433 based on a tally of MAC address receptions by the various compliant devices. As such, the second and third partial trees are connected by way of the compliant switches 422, 433. Subsequently, as represented by block 6-10, the method 600 includes performing link discovery between the connecting devices in order to determine the characteristics of the link (e.g., estimate the number of intermediate nodes on the link). A more detailed method of link discovery is described below with reference to FIG. 7.

Figure 7:
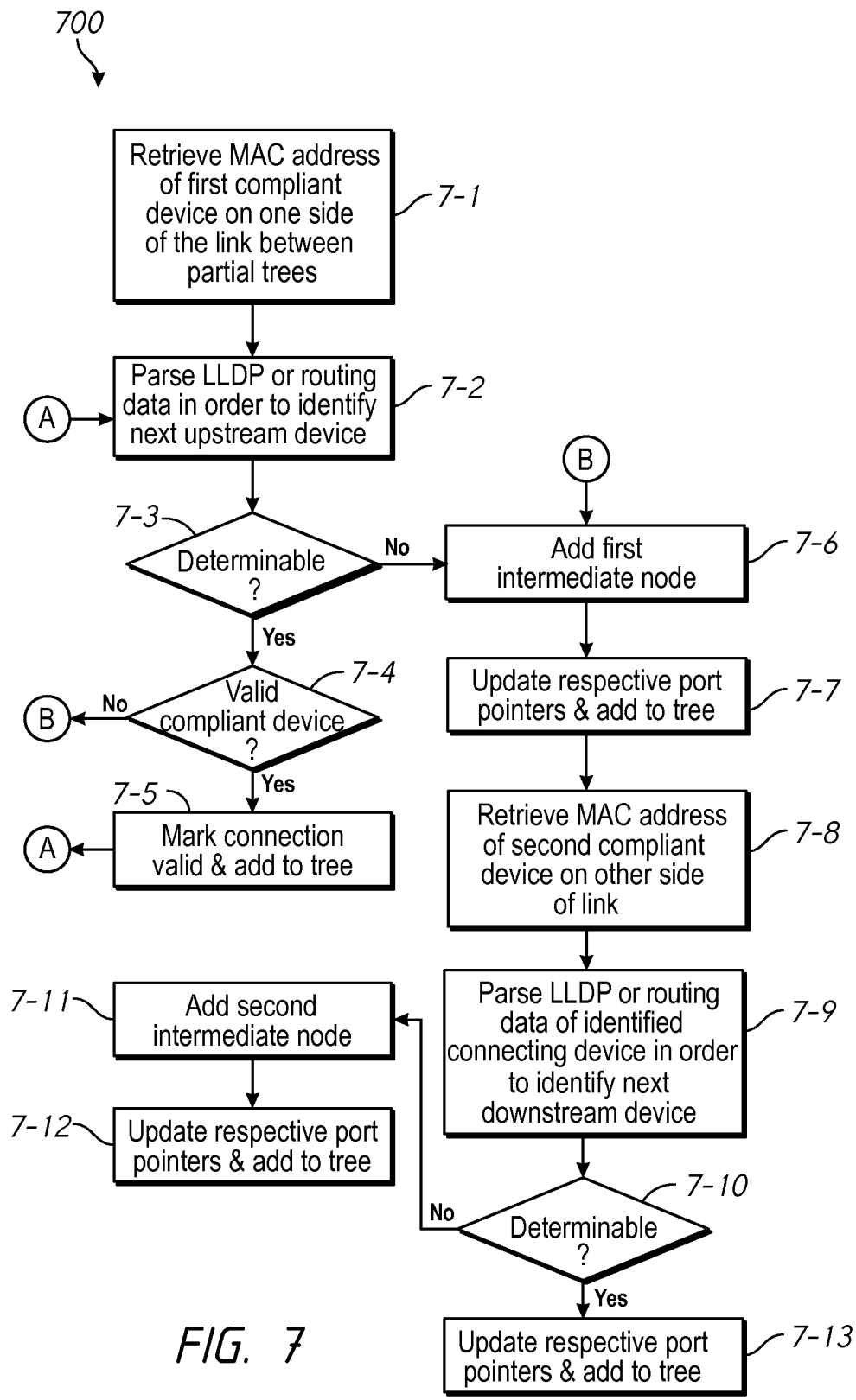
FIG. 7 is a flowchart representation of a method of link discovery associated with network topology-link map data in accordance with some implementations.

Turning to FIG. 7, shown is a flowchart representation of a method 700 of link discovery according to some implementations. For the sake of additional clarity and detail, the method 700 is described with continued reference to FIGS. 1A, 4D, and 4E introduced above. In some implementations, the method 700 is performed by a network topology module operating on and/or in coordination with a server system (e.g., cloud hosted management server 112). Additionally and/or alternatively, in some implementations, the method 700 is performed by and/or in coordination with a gateway node (e.g., gateway node 151) of a LAN and/or a portion of a VLAN.

Briefly, the method 700 includes adding a first intermediate node between the first network device and the selected one of the plurality of compliant devices in a topology-link map in response to determining that a second network device upstream of the first network device is one of undeterminable and a non-compliant device, updating respective port pointers of the first network device such that the topology-link map indicates that the first network device directs externally addressed traffic to the first intermediate node. In some implementations, the method 700 also includes adding a second intermediate node between the first network device and the selected one of the plurality of compliant devices in a topology-link map in response to determining that a third network device downstream of the selected one of the plurality of compliant devices is one of undeterminable and a non-compliant device; and updating respective port pointers associated with the selected one of the plurality of compliant devices such that the topology-link map indicates that the selected one of the plurality of compliant devices receives externally addressed traffic from the second intermediate node.

To that end, as represented by block 7-1, the method 700 includes retrieving the respective MAC address of a first compliant device on one side of the link identified between the two partial trees. For example, with reference to FIGS. 4D and 4E, the compliant switch 433 is selected because it is on one side of the link between the second and third partial trees. As represented by block 7-2, the method 700 includes parsing LLDP and/or routing data (or the like) in order to identify the next upstream device relative to the selected device. As represented by block 7-3, the method 700 includes evaluating whether or not the next upstream device can be identified from the LLDP and/or routing data. If the next upstream device is determinable ("Yes" path from block 7-3), as represented by block 7-4, the method 700 includes determining if the next upstream device is a valid compliant device. Continuing with the example, the next upstream device from the compliant switch 433 could be the compliant switch 422 (not shown). If the next upstream device is a valid compliant device ("Yes" path from block 7-4), as represented by block 7-5, the method 700 includes marking or recording the connection as valid and adding it to the tree (i.e., a representation of the topology-link map data). On the other hand, with respect to both blocks 7-3 and 7-4, if the next upstream device is not determinable ("No" path from block 7-3) or is determinable but not a valid compliant device ("No" path from block 7-4), as represented by block 7-6, the method 700 includes adding a first intermediate node. For example, with reference to FIG. 4D, a first intermediate node 404 is added to the topology-link map data. Similarly, in another example with reference to FIG. 4E, an intermediate node 406 is added to the topology-link map data. As represented by block 7-7, the method 700 includes updating the port pointers of the first compliant device (e.g., for port 433e of the compliant switch 433) and adding the link to the topology-link map data.

Subsequently, as represented by block 7-8, the method 700 includes retrieving the respective MAC address of a second compliant device on the other side of the link identified between the two partial trees. Continuing with the example, with reference to FIGS. 4D and 4E, the compliant switch 422 is selected. As represented by block 7-9, the method 700 includes parsing LLDP and/or routing data (or the like) in order to identify the next downstream device relative to the selected device. As represented by block 7-10, the method 700 includes evaluating whether or not the next downstream device can be identified from the LLDP and/or routing data. If the next downstream device is determinable ("Yes" path from block 7-10), as represented by block 7-13, the method 700 includes updating the port pointers of the second compliant device (e.g., for port 422c of the compliant switch 422) and adding the link to the topology-link map data. For example, with reference to FIG. 4E, the compliant switch 422 identifies the intermediate node 406 as its downstream device, even though the compliant device 404 could not initially identify the intermediate node 406 as its upstream device using the LLDP data (or the like). On the other hand, if the next downstream device is not determinable ("No" path from block 7-10), as represented by block 7-11, the method 700 includes adding a second intermediate node. For example, with reference to FIG. 4D, a second intermediate node 406 is added to the topology-link map data. As represented by block 7-12, the method 700 includes updating the port pointers of the second compliant device (e.g., for port 422c of the compliant switch 422) and adding the link to the topology-link map data.

Figure 8:
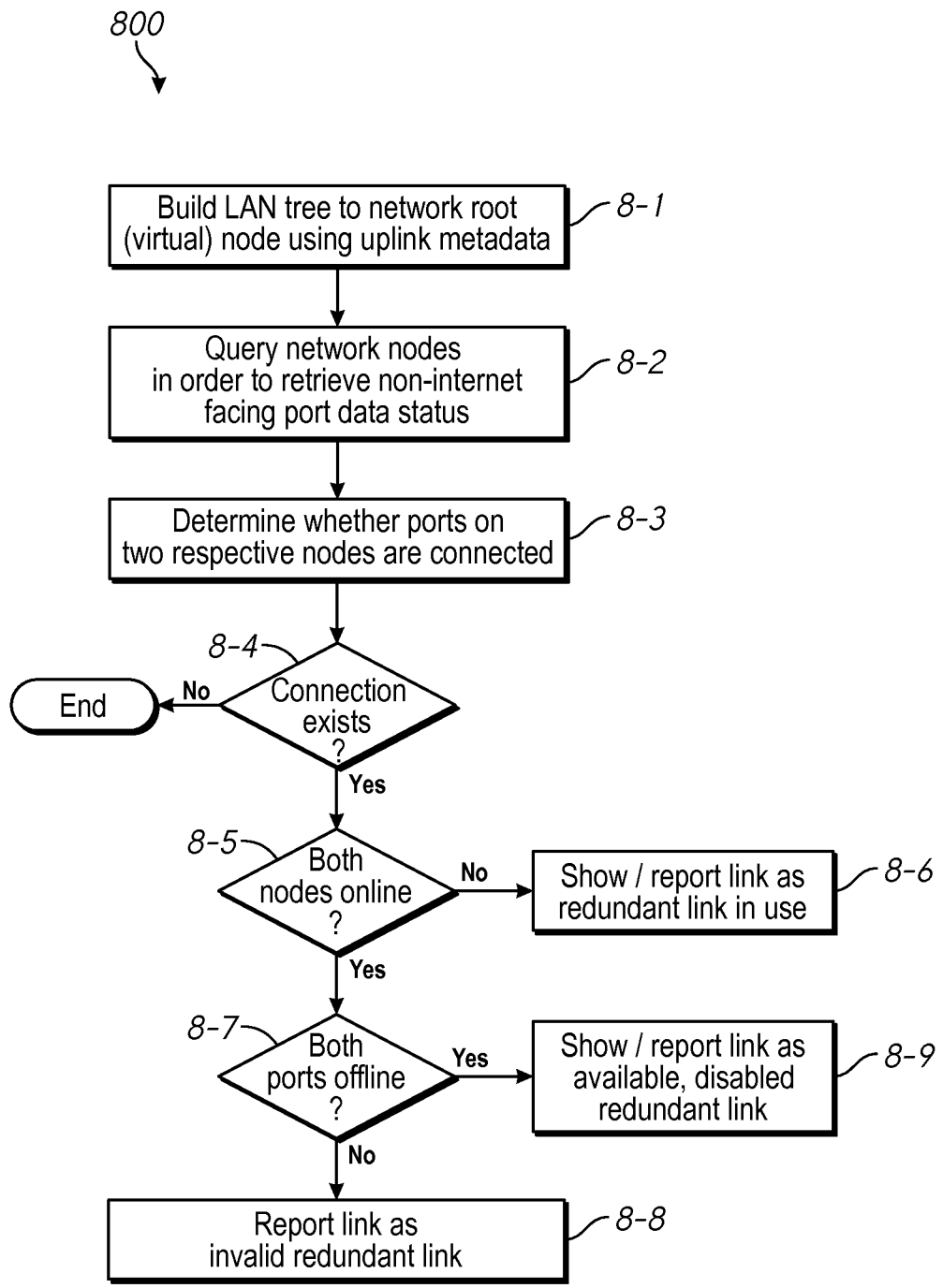
FIG. 8 is a flowchart representation of a method of determining connections between non-external facing ports in a network in accordance with some implementations.

FIG. 8 is a flowchart representation of a method 800 of determining connections between non-external facing (e.g., not directed towards the Internet) ports in a network in accordance with some implementations. For the sake of additional clarity and detail, the method 800 is described with continued reference to FIGS. 1A, 4F and 4G. In some implementations, the method 800 is performed by a network topology module operating on and/or in coordination with a server system (e.g., cloud hosted management server 112). Additionally and/or alternatively, in some implementations, the method 800 is performed by and/or in coordination with a gateway node (e.g., gateway node 151) of a LAN and/or a portion of a VLAN. Briefly, the method 800 includes identifying one or more port pair connections between non-external network facing ports associated with respective pairs of compliant devices, determining the respective status of the associated compliant devices, and adding link data for a particular one of the one or more port pair connections to topology-link map data based at least on the determined respective status of each compliant device.

To that end, as represented by block 8-1, the method 800 includes building a LAN tree (i.e., topology-link map data of LAN) to a network root node using uplink metadata reported from compliant devices. For example, as described above with reference to the methods 300, 500, 600, a sixth view 400f of the topology-link map data shows the network root node 452 introduced to connect any disconnected trees that remain after performance of the methods described above. As noted above, in some implementations, the root node 452 is a virtual node or logical place-holder, and thus does not really exist in the LAN. In such instances, the root node 452 merely provides a convenient LAN node that is separate from the gateway node 151. In some implementations, the root node 452 is an actual device that is separate from the gateway node 151. In some implementations, the root node 452 is included as a part of the gateway node 151.

As represented by block 8-2, the method 800 includes querying the network nodes previously identified in order to retrieve information about the use and connections associated non-Internet (or more generally, non-external) facing ports. Those of ordinary skill in the art will appreciate that non-Internet facing ports are ports that are not used by nodes to transmit externally addressed traffic in normal operation. As represented by block 8-3, the method 800 includes determining whether or non-Internet facing ports on two separate nodes are connected (i.e., are there any port pair connections?). In other words, the method 800 includes attempting to identify one or more pairs of non-Internet facing ports that are connected within the LAN.

As represented by block 8-4, the method 800 includes determining whether any port pair connections have been identified. If no port pair connections have been identified ("No" path from block 8-4), the method 500 ends with the assumption that the LAN topology-link map data is substantially complete in accordance with some implementations. On the other hand, if a port pair connection exists ("Yes" path from block 8-4), the method 800 includes further assessing the nature of the link between the port pair connection. For example, with reference to FIG. 4G, the seventh view 400g of the topology-link map data shows example connections between non-external facing ports. For example, a non-external facing connection 407 exists between port 421b of compliant switch 421 and port 412d of compliant switch 412. In another example, another non-external facing connection 409 exists between port 431a of compliant switch 431 and port 422e of compliant switch 422.

As represented by block 8-5, the method 800 includes determining whether or not both nodes associated with a port pair connection are online and operating normally. If both nodes are not online and operating normally ("No" path from block 8-5), as represented by block 8-6, the method 800 includes determining that a redundant link is in use because of a failure at one of the two nodes, and showing and/or storing data indicating the operating redundant link accordingly in the topology-link map data. For example, with continued reference to FIG. 4G, the solid line representing the connection 409 indicates that the redundant link between compliant switches 422, 431 is in use. On the other hand, if both nodes are online and operating normally ("Yes" path from block 8-5), as represented by block 8-7, the method 800 includes determining whether or not the respective ports of the connection pair are offline. If both nodes are offline ("Yes" path from block 8-7), as represented by block 8-9, the method 800 includes determining that a redundant link is available but disabled, and showing and/or storing data indicating the available but disabled redundant link accordingly in the topology-link map data. For example, with continued reference to FIG. 4G, the dashed line representing the connection 407 indicates that the redundant link between compliant switches 412, 421 is available but disabled. On the other hand, if both nodes are not offline ("No" path from block 8-7), as represented by block 8-8, the method 800 includes determining that the redundant link is in a failed state and/or is invalid.

Figure 9:
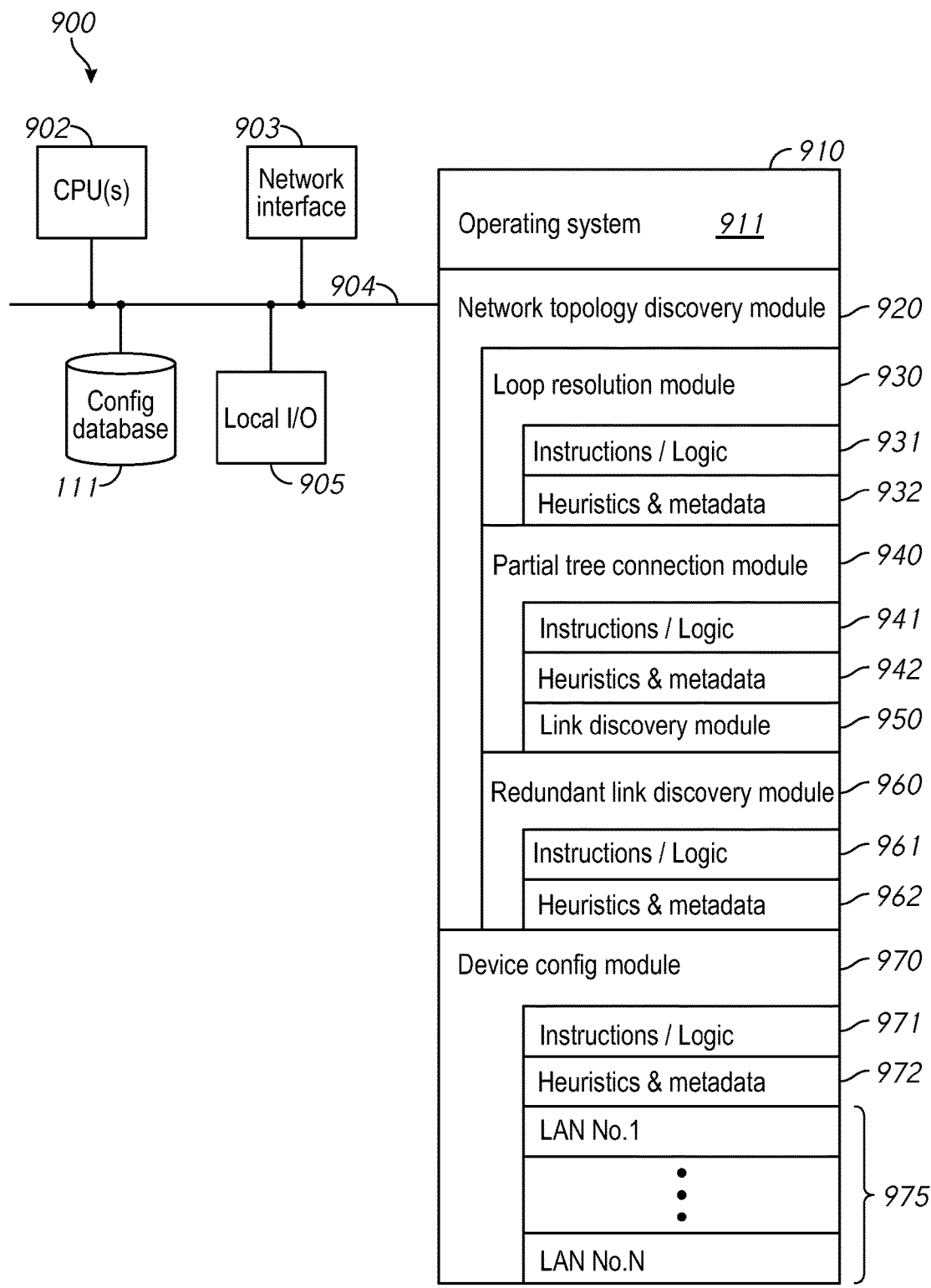
FIG. 9 is a block diagram of an example of a network resource management system in accordance with some implementations.

FIG. 9 is a block diagram of an example of a network resource management system 900 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the network resource management system 900 includes one or more processing units (CPU's) 902, the configuration database 111, a network interface 903, a memory 910, a local I/O interface 905, and one or more communication buses 904 for interconnecting these and various other components.

In some implementations, the communication buses 904 include circuitry that interconnects and controls communications between system components. The memory 910 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 910 optionally includes one or more storage devices remotely located from the CPU(s) 902. The memory 910 comprises a non-transitory computer readable storage medium. In some implementations, the memory 910 or the non-transitory computer readable storage medium of the memory 910 stores the following programs, modules and data structures, or a subset thereof including an optional operating system 911, a network topology discovery module 920, and device configuration module 970.

The operating system 911 includes procedures for handling various basic system services and for performing hardware dependent tasks.

In some implementations, the network topology discovery module 920 is configured to determine network topology-link map data of a LAN or a portion of a VLAN based at least on uplink metadata from compliant devices. To that end, in various implementations, the network topology discovery module 920 includes a loop resolution module 930, a partial tree connection module 940 and a redundant link discovery module 960.

In some implementations, the loop resolution module 930 is configured to resolve erroneous connectivity loops in network topology-link map data in accordance with some implementations. For example, the loop resolution module 930 is configured to operate as described above with reference to the method 500. To that end, in various implementations, the loop resolution module 930 includes instructions and/or logic 931, heuristics and metadata 932.

In some implementations, the partial tree connection module 940 is configured to link disconnected partial trees in network topology-link map data in accordance with some implementations. For example, the partial tree connection module 940 is configured to operate as described above with reference to the method 600. To that end, in various implementations, the partial tree connection module 940 includes instructions and/or logic 941, heuristics and metadata 942, and a link discovery module 950. In some implementations, the link discovery module 950 is configured to characterize an identified link between partial trees in network topology-link map data in accordance with some implementations. For example, the link discovery module 950 is configured to operate as described above with reference to the method 700.

In some implementations, the redundant link discovery module 960 is configured to determine the use and connections associated with non-external facing ports in accordance with some implementations. For example, the redundant link discovery module 960 is configured to operate as described above with reference to the method 800. To that end, in various implementations, the redundant link discovery module 960 includes instructions and/or logic 961, and heuristics and metadata 962.

In some implementations, the device configuration module 970 is configured to manage the configuration and operation of compliant devices in a LAN and/or across geographically distributed portions of a VLAN. To that end, in various implementations, the device configuration module 970 includes instructions and/or logic 971, heuristics and metadata 972, and data specific to one or more LANs 975 (i.e., LAN No. 1, . . . , LAN No. N).

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   determining whether or not a loop exists within uplink metadata associated with first and second compliant devices, wherein the loop in the uplink metadata is characterized by pointers provided to indicate that the first and second compliant devices operate to send externally addressed traffic to one another contrary to the operation of the first and second compliant devices within a network; and
   resolving the loop by adding a non-compliant device to topology-link map data associated with the first and second compliant devices in response to determining the existence of the loop, wherein the topology-link map data archives accessible information about the topology of the network based at least on the uplink metadata,
   wherein a non-compliant device erroneously forwards uplink metadata received from one compliant device to another, and correctly routes externally addressed traffic received from the compliant devices towards a gateway node, of the network, characterizing one of a local area network (LAN) or a portion of a virtual LAN (VLAN).

2. The method of claim 1, wherein determining whether or not a loop exist according to the uplink metadata includes:
   determining that the first compliant device is identified as to where externally addressed data is sent by the second compliant device according to respective uplink metadata associated with the second compliant device;
   determining a target device relative to the first compliant device, wherein the target device is identified as to where externally addressed data is sent by the first compliant device according to respective uplink metadata associated with the first compliant device; and
   determining loop existence according to the uplink metadata when the second compliant device matches the target device.

3. The method of claim 2, wherein determining that the first compliant device is identified, in the respective uplink metadata, as to where externally addressed data is sent by the second compliant device includes identifying an external-facing port of the second compliant device and evaluating respective uplink metadata associated with the external-facing port.

4. The method of claim 2, wherein determining the target device includes identifying an external-facing port of the first compliant device and evaluating respective uplink metadata associated with the external-facing port.

5. The method of claim 1, wherein resolving the loop further comprises overwriting respective port pointers from the first and second compliant devices so that the respective port pointers of the first and second compliant devices are directed to the non-compliant device, and wherein the topology-link map data includes respective pointers to the non-compliant device from the first and second compliant devices.

6. The method of claim 1, wherein resolving the loop further comprises:
   determining port connections to other devices on ports associated with the loop; and
   updating one or more respective port pointers associated with the loop in order to remove remaining artifacts of the loop from the topology-link map data.

7. The method of claim 1 further comprising marking or recording that the uplink metadata associated with the first and second compliant devices is valid and adding that information to the topology-link map data in response to determining that a loop does not exist between the first and second compliant devices.

8. The method of claim 1 further comprising:
   transmitting a broadcast query for uplink metadata to devices included in a local area network (LAN) or a portion of a virtual LAN (VLAN);
   receiving uplink metadata reported by a plurality of compliant devices within the LAN or the portion of the VLAN;
   identifying each of the plurality of compliant devices reporting uplink metadata in response to the broadcast query; and
   selecting the first and second compliant devices from the plurality of client devices that reported uplink metadata in response to the transmitted broadcast query.

9. The method of claim 8, wherein the broadcast query is transmitted to the LAN or the portion of the VLAN through a metadata tunnel.

10. The method of claim 8 further comprising:
    receiving at least one error packet from a non-compliant device in response to the broadcast query; and
    identifying the non-compliant device from one or more data fields in the error packet.

11. A device comprising:
a network interface configured to receive uplink metadata associated with a number of compliant devices; and
a loop resolution module configured to determine whether or not a loop exists within uplink metadata associated with first and second compliant devices, and resolve the loop by adding a non-compliant device to topology-link map data associated with the first and second compliant devices in response to determining the existence of the loop,
wherein a non-compliant device erroneously forwards uplink metadata received from one compliant device to another, and correctly routes externally addressed traffic received from the compliant devices towards a gateway node, of the network, characterizing one of a local area network (LAN) or a portion of a virtual LAN (VLAN).

12. The device of claim 11, wherein the network interface is configured to establish a metadata tunnel to one of a local area network (LAN) or a portion of a virtual LAN (VLAN).

13. The device of claim 12, further comprising a device configuration module is configured to manage the configuration and operation of compliant devices in a LAN and/or across geographically distributed portions of a VLAN.

14. The device of claim 11, wherein the loop in the uplink metadata is characterized by pointers provided to indicate that the first and second compliant devices operate to send externally addressed traffic to one another contrary to the operation of the first and second compliant devices within a network.

15. The device of claim 11, wherein the topology-link map data archives accessible information about the topology of the network based at least on the uplink metadata.

16. The device of claim 11, wherein the loop resolution module comprises:
one or more processors; and
a non-transitory memory including instructions, that when executed by the one or more processors, cause the device to:
determine whether or not a loop exists within uplink metadata associated with first and second compliant devices; and
resolve the loop by adding a non-compliant device to topology-link map data associated with the first and second compliant devices in response to determining the existence of the loop.

17. The device of claim 11, wherein resolving the loop further comprises overwriting respective port pointers from the first and second compliant devices so that the respective port pointers of the first and second compliant devices are directed to the non-compliant device, and wherein the topology-link map data includes respective pointers to the non-compliant device from the first and second compliant devices.

18. A system comprising:
a network interface configured to receive uplink metadata associated with a number of compliant devices, and establish a metadata tunnel to one of a local area network (LAN) or a portion of a virtual LAN (VLAN);
a device configuration module is configured to manage the configuration and operation of compliant devices in one of the LAN and the portion of the VLAN; and
a loop resolution module configured to determine whether or not a loop exists within uplink metadata associated with first and second compliant devices, and resolve the loop by adding a non-compliant device to topology-link map data associated with the first and second compliant devices in response to determining the existence of the loop,
wherein a non-compliant device erroneously forwards uplink metadata received from one compliant device to another, and correctly routes externally addressed traffic received from the compliant devices towards a gateway node, of the network, characterizing one of a local area network (LAN) or a portion of a virtual LAN (VLAN).

19. The system of claim 18 wherein the loop resolution module is also configured to:
transmit a broadcast query for uplink metadata to devices included in one of the LAN and the portion of the VLAN;
identify each of the plurality of compliant devices reporting uplink metadata in response to the broadcast query; and
select the first and second compliant devices from the plurality of client devices that reported uplink metadata in response to the transmitted broadcast query.

* * * * *